US008843905B2

(12) United States Patent
Nara et al.

(10) Patent No.: US 8,843,905 B2
(45) Date of Patent: Sep. 23, 2014

(54) SERVER APPARATUS, MANUFACTURING APPARATUS, GROUP MANAGEMENT SYSTEM, INFORMATION PROCESSING METHOD, AND STORAGE MEDIUM

(75) Inventors: Kohei Nara, Sapporo (JP); Toshihiko Kanno, Oshu (JP)

(73) Assignee: Tokyo Electron Limited, Tokyo (JP)

( * ) Notice: Subject to any disclaimer, the term of this patent is extended or adjusted under 35 U.S.C. 154(b) by 1280 days.

(21) Appl. No.: 11/982,543

(22) Filed: Nov. 1, 2007

(65) Prior Publication Data

US 2008/0134168 A1 Jun. 5, 2008

(30) Foreign Application Priority Data

Nov. 2, 2006 (JP) ................................. 2006-298359
Aug. 6, 2007 (JP) ................................. 2007-204110

(51) Int. Cl.
*G06F 9/445* (2006.01)

(52) U.S. Cl.
CPC ........................................ *G06F 8/65* (2013.01)
USPC .......................................... 717/138; 717/178

(58) Field of Classification Search
None
See application file for complete search history.

(56) References Cited

U.S. PATENT DOCUMENTS

| 6,704,933 B1 * | 3/2004 | Tanaka et al. ................ 725/132 |
| 6,990,660 B2 * | 1/2006 | Moshir et al. ................ 717/171 |
| 2006/0080656 A1 * | 4/2006 | Cain et al. ................ 717/174 |

FOREIGN PATENT DOCUMENTS

| JP | 2000-305757 A | 11/2000 |
| JP | 2002-025997 A | 1/2002 |
| JP | 2002-215400 A | 8/2002 |
| JP | 2002-217182 A | 8/2002 |
| JP | 2002-217182 A | 8/2002 |
| JP | 2003-167746 A | 6/2003 |
| JP | 2004-047837 A | 2/2004 |
| JP | 3543996 B | 7/2004 |
| JP | 2006-073845 A | 3/2006 |
| WO | WO 2005/033940 A1 | 4/2005 |

OTHER PUBLICATIONS

Rejection in JP2007-204110, mailing date of Dec. 15, 2008, 3 pages, Japan Patent Office.

* cited by examiner

*Primary Examiner* — Chuck Kendall
(74) *Attorney, Agent, or Firm* — Pearne & Gordon LLP

(57) ABSTRACT

The present invention transmits upgrade information as appropriate from a server apparatus to one or more manufacturing apparatuses for performing a predetermined semiconductor process on processing target substrates. A server apparatus is provided with an upgrade information receiving portion that receives upgrade information, which is information for upgrading an execution software program for controlling the manufacturing apparatus; a state information storage portion in which state information, which is information relating to a state of the manufacturing apparatus, is stored; a transmission judging portion that judges whether or not to transmit the upgrade information to the manufacturing apparatus, using the state information; and a transmitting portion that transmits the upgrade information to the manufacturing apparatus to which the transmission judging portion has judged to transmit the upgrade information.

17 Claims, 18 Drawing Sheets state information

| apparatus identification information | processing flag | communicable flag | version |
|---|---|---|---|
| D001 | 1 | 1 | 020 |
| D002 | 0 | 1 | 021 |
| D003 | 1 | 1 | 020 |
| D004 | 0 | 0 | 020 |
| ⋮ | ⋮ | ⋮ | ⋮ |

FIG.11

| apparatus identification information | processing flag | communicable flag | version |
|---|---|---|---|
| D001 | 0 | 1 | 020 |
| D002 | 0 | 1 | 021 |
| D003 | 1 | 1 | 020 |
| D004 | 0 | 0 | 020 |
| ⋮ | ⋮ | ⋮ | ⋮ | state information

FIG.13

| transmitted flag | apparatus identification information | upgrade information |
|---|---|---|
| 0 | D001 | upgrade_v021.exe |
| 0 | D002 | |
| 0 | D003 | |
| 0 | D004 | |
| 1 | D111 | upgrade_v252.exe |
| ⋮ | ⋮ | ⋮ |
| ⋮ | ⋮ | ⋮ |

FIG.14

| apparatus identification information | IP address |
|---|---|
| D001 | 192.168.0.1 |
| D002 | 192.168.0.2 |
| D003 | 192.168.0.3 |
| ⋮ | ⋮ |

FIG.15

| transmitted flag | apparatus identification information | upgrade information |
|---|---|---|
| 1 | D001 | upgrade_v021.exe |
| 0 | D002 | |
| 0 | D003 | |
| 0 | D004 | |
| 1 | D111 | upgrade_v252.exe |
| ⋮ | ⋮ | |
| ⋮ | ⋮ | ⋮ |

FIG.16

SERVER APPARATUS, MANUFACTURING APPARATUS, GROUP MANAGEMENT SYSTEM, INFORMATION PROCESSING METHOD, AND STORAGE MEDIUM

BACKGROUND OF THE INVENTION

1. Field of the Invention

The present invention relates to server apparatuses and the like that transmit upgrade information to manufacturing apparatuses.

2. Description of Related Art

Conventionally, a group management system has been known that is provided with one or more manufacturing apparatuses for performing a predetermined semiconductor process on processing target substrates, and a server apparatus connected to the one or more manufacturing apparatuses.

An execution software program for controlling the manufacturing apparatuses is upgraded in the following manner. First, MO drives, CD drives, or the like are connected to the manufacturing apparatuses, and information used for upgrading the software program is copied to the manufacturing apparatuses. When the information used for upgrading is installed on the manufacturing apparatuses, upgrade of the software program is completed.

It should be noted that as a related technique, there is a recipe management method for matching recipes retained by both of a server apparatus and one or more semiconductor manufacturing apparatus (see JP 2006-73845A, for example). Furthermore, as a related technique, there is also a method for transmitting a program used in a semiconductor manufacturing apparatuses, from an external apparatus (see JP 2004-47837A and JP 2002-217182A, for example).

Furthermore, as a related technique, so-called batch-type vertical heat treatment apparatuses have been known (see Japanese Patent No. 3543996 and JP 2002-25997A).

However, when information used for upgrading is copied to and installed on each of manufacturing apparatuses, there are the problems that an operator has to perform a very complicated operation, and it takes much time to perform this operation.

It should be noted that although a method for matching recipes between a server apparatus and manufacturing apparatuses has been known as described above, a method for upgrading an execution software program for controlling manufacturing apparatuses as appropriate via a network has not been known.

SUMMARY OF THE INVENTION

The present invention was arrived at in order to solve the above-described problems, and it is an object thereof to provide a server apparatus and the like that can upgrade as appropriate an execution software program for controlling one or more manufacturing apparatuses in a group management system, without performing a complicated operation.

In order to achieve the above-described object, a server apparatus according to the present invention is a server apparatus included in a group management system that is provided with one or more manufacturing apparatuses for performing a predetermined semiconductor process on processing target substrates, with the server apparatus connected to the one or more manufacturing apparatuses, the server apparatus comprising: an upgrade information receiving portion that receives upgrade information, which is information for upgrading an execution software program for controlling the manufacturing apparatus; a state information storage portion in which state information, which is information relating to a state of the manufacturing apparatus, and is information that contains information relating to whether or not the manufacturing apparatus is performing a process, is stored; a transmission judging portion that judges not to transmit the upgrade information to the manufacturing apparatus if the state information indicates that the manufacturing apparatus is performing a process, and that judges whether to transmit the upgrade information to the manufacturing apparatus if the state information indicates that the manufacturing apparatus is not performing a process; and a transmitting portion that transmits the upgrade information to the manufacturing apparatus to which the transmission judging portion has judged to transmit the upgrade information.

With this configuration, it is possible to upgrade an execution software program for controlling the manufacturing apparatus, by transmitting the upgrade information from the server apparatus to the manufacturing apparatus. Thus, the advantage is obtained that an operator does not have to perform complicated and time-consuming processing for upgrading the software program of the manufacturing apparatuses as in conventional examples. For example, processing in which the manufacturing apparatus is connected to an external drive, and the upgrade information is captured from the external drive into the manufacturing apparatus does not have to be performed for each of the manufacturing apparatuses.

Furthermore, the server apparatus judges whether or not to transmit the upgrade information, and transmits the upgrade information if it is judged appropriate to perform transmission. Thus, in a case where transmission is inappropriate, transmission of the upgrade information can be avoided, and an appropriate upgrade of the software program can be implemented later.

Furthermore, it is possible not to transmit the upgrade information in a case where the manufacturing apparatus is performing a process. For example, in a case where the upgrade information is transmitted to the manufacturing apparatus that is performing a process, then due to the load generated by processing such as reception or accumulation of the upgrade information, inappropriate control and the like may be generated in the process that is being performed, and appropriate manufacture may not be performed. However, with this configuration, such a situation can be avoided.

Moreover, in the server apparatus according to the present invention, the execution software program may be a system program of the manufacturing apparatus.

With this configuration, whether or not to transmit the upgrade information is judged, which is effective because it seems that when the execution software program is a system program, the volume of the upgrade information is generally large, and thus the manufacturing apparatus is greatly affected by transmission of the upgrade information.

Moreover, in the server apparatus according to the present invention, if at least a certain ratio of the manufacturing apparatuses or at least a certain number of the manufacturing apparatuses are performing a process, then the transmission judging portion may judge not to transmit the upgrade information, or if not, the transmission judging portion may judge to transmit the upgrade information.

With this configuration, for example, a situation can be avoided in which a process that is being performed by the manufacturing apparatuses is interrupted when the volume of communication necessary for that process cannot be secured because transmission of the upgrade information occupies a large volume of communication lines.

Moreover, in the server apparatus according to the present invention, the state information may contain information relating to whether or not the manufacturing apparatus is communicable with the server apparatus, and the transmission judging portion may judge not to transmit the upgrade information, to the manufacturing apparatus that is indicated by the state information to be incommunicable with the server apparatus.

With this configuration, it is possible not to transmit the upgrade information in a case where the manufacturing apparatus is incommunicable with the server apparatus. For example, if the upgrade information is transmitted to the manufacturing apparatus with which communication is not possible, unnecessary information is transmitted. However, with this configuration, such a situation can be avoided.

Moreover, in the server apparatus according to the present invention, the state information may contain information relating to a version of a software program used in the manufacturing apparatus, and the transmission judging portion may judge not to transmit the upgrade information, to the manufacturing apparatus that is indicated by the state information to be using a software program whose version is the same as or later than a version of a software program upgraded with the upgrade information that has been received by the upgrade information receiving portion.

With this configuration, it is possible not to transmit unnecessary upgrade information to the manufacturing apparatus.

Moreover, in the server apparatus according to the present invention, if the transmission judging portion judges not to transmit the upgrade information to one manufacturing apparatus, then after the judgment, the transmission judging portion may judge again whether or not to transmit the upgrade information to the one manufacturing apparatus, using the state information.

With this configuration, even if it is judged not to transmit the upgrade information to one manufacturing apparatus, it is possible to transmit the upgrade information to the manufacturing apparatus later.

Moreover, the server apparatus according to the present invention may further comprise an instruction information storage portion in which instruction information, which is information indicating an instruction to create a predetermined folder, is stored, and the transmitting portion may also transmit the instruction information.

With this configuration, in a case where the upgrade information is to be stored in a predetermined folder, the predetermined folder can be created in the manufacturing apparatus.

Moreover, the server apparatus according to the present invention may further comprise a folder judging portion that judges whether or not the predetermined folder is present in the manufacturing apparatus to which the upgrade information is to be transmitted, and if the folder judging portion judges that the predetermined folder is not present in the manufacturing apparatus, then the transmitting portion may transmit the instruction information.

With this configuration, in a case where the predetermined folder is not present in the manufacturing apparatus, the predetermined folder can be created in the manufacturing apparatus.

Moreover, the server apparatus according to the present invention may further comprise: a state information receiving portion that receives the state information of the manufacturing apparatus; and a state information updating portion that updates the state information stored in the state information storage portion, according to the state information that has been received by the state information receiving portion.

With this configuration, the state information stored in the state information storage portion in the server apparatus can be updated as appropriate according to the actual state of the manufacturing apparatus.

Moreover, in the server apparatus according to the present invention, when the transmitting portion is transmitting the upgrade information, if it is detected based on the state information that the manufacturing apparatus as a transmission destination of the upgrade information has started a process, then the transmission judging portion may judge to cancel the transmission of the upgrade information, and during transmission of the upgrade information, if the transmission judging portion judges to cancel the transmission of the upgrade information, then the transmitting portion may cancel the transmission of the upgrade information.

With this configuration, it is possible not to generate the load relating to transmission of the upgrade information, during a process, to the manufacturing apparatus as a transmission destination of the upgrade information, so that it is possible not to interrupt the process.

Moreover, in the server apparatus according to the present invention, when the transmitting portion is transmitting the upgrade information, if it is detected based on the state information that at least a certain ratio of the manufacturing apparatuses or at least a certain number of the manufacturing apparatuses have started a process, then the transmission judging portion may judge to cancel the transmission of the upgrade information, and during transmission of the upgrade information, if the transmission judging portion judges to cancel the transmission of the upgrade information, then the transmitting portion may cancel the transmission of the upgrade information.

With this configuration, it is possible not to occupy line bands with transmission of the upgrade information, in the communication lines in the group management system, in a case where at least a certain ratio of or at least a certain number of manufacturing apparatuses have started a process. As a result, congestion or delay in communication can be prevented from occurring in the communication lines, and thus the manufacturing apparatuses that are performing a process can comfortably use the communication lines in the group management system, so that the process in the manufacturing apparatuses can be prevented from being interrupted.

With the server apparatus and the like according to the present invention, it is possible to upgrade an execution software program for controlling one or more manufacturing apparatuses in a group management system, without performing a complicated operation.

BRIEF DESCRIPTION OF THE DRAWINGS

FIG. 11 is a diagram showing an example of state information stored in the server apparatus in this embodiment.

FIG. 13 is a diagram showing an example of state information stored in the server apparatus in this embodiment.

FIG. 14 is a diagram showing an example of the correspondence between the upgrade information and the apparatus identification information stored in the server apparatus in this embodiment.

FIG. 15 is a diagram showing an example of the correspondence between the apparatus identification information and the IP address stored in the server apparatus in this embodiment.

FIG. 16 is a diagram showing an example of the correspondence between the upgrade information and the apparatus identification information stored in the server apparatus in this embodiment.

DETAILED DESCRIPTION OF THE INVENTION

Figure 1:
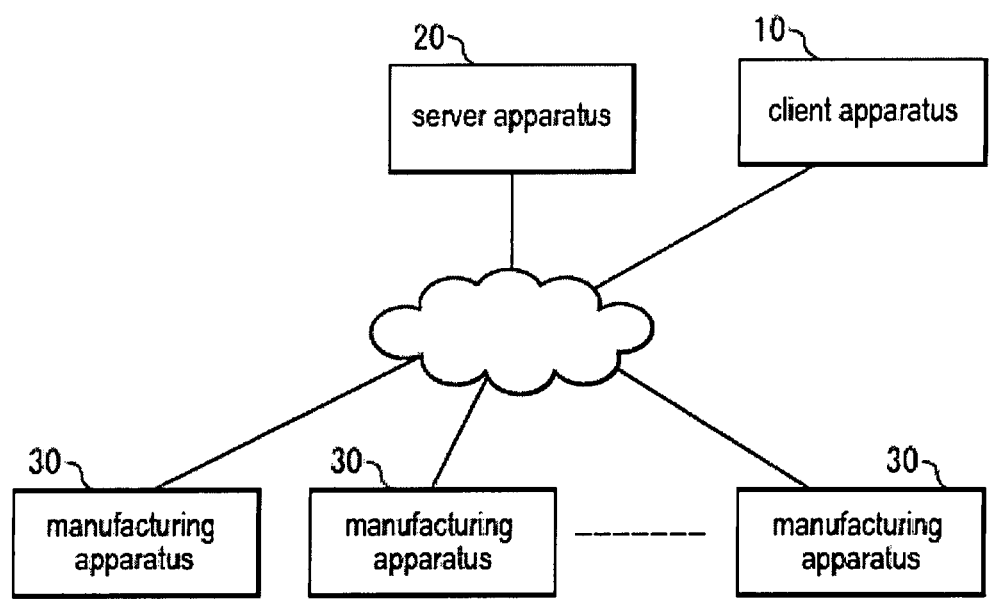
FIG. 1 is a block diagram showing the configuration of a group management system according to Embodiment 1 of the present invention.

Hereinafter, a group management system and the like according to the present invention are described using embodiments. In the following embodiments, components and steps indicated by the same reference numerals are the same or similar, and thus a description thereof may not be repeated.

Embodiment 1

Herein, a group management system according to Embodiment 1 of the present invention is described with reference to the drawings.

FIG. 1 is a block diagram showing the configuration of a group management system according to this embodiment. In FIG. 1, the group management system according to this embodiment is provided with a client apparatus 10, a server apparatus 20, and N manufacturing apparatuses 30, where N refers to an integer of 1 or more. In the group management system, the client apparatus 10, the server apparatus 20, and the one or more manufacturing apparatuses 30 are communicably connected to each other via a wired or wireless communication line. Examples of the communication line include the Internet, intranets, and public telephone networks.

The client apparatus 10 sends various requests to the server apparatus 20, and receives the processing results in the server apparatus 20.

The server apparatus 20 receives upgrade information, and transmits the upgrade information to the manufacturing apparatuses 30. This processing is described later in detail. Furthermore, in the server apparatus 20, various measurement information in the one or more manufacturing apparatuses 30 can be stored. Furthermore, the server apparatus 20 performs processing in response to a request from the client apparatus 10, and transmits the processing results as appropriate to the client apparatus 10.

The manufacturing apparatuses 30 are apparatuses for performing a predetermined semiconductor process on processing target substrates. The manufacturing apparatuses 30 are, for example, semiconductor manufacturing apparatuses or liquid crystal panel manufacturing apparatuses. The processing target substrates are, for example, semiconductor wafers, glass substrate, or plastic substrates. It should be noted that as long as the predetermined semiconductor process performed by the manufacturing apparatuses 30 on the processing target substrates includes at least a process relating to a semiconductor, its pre-treatment or post-treatment may or may not be included. The processing performed by the manufacturing apparatuses 30 on the processing target substrates is, for example, a film-forming process, an etching process, or a thermal oxidation process.

Figure 2:
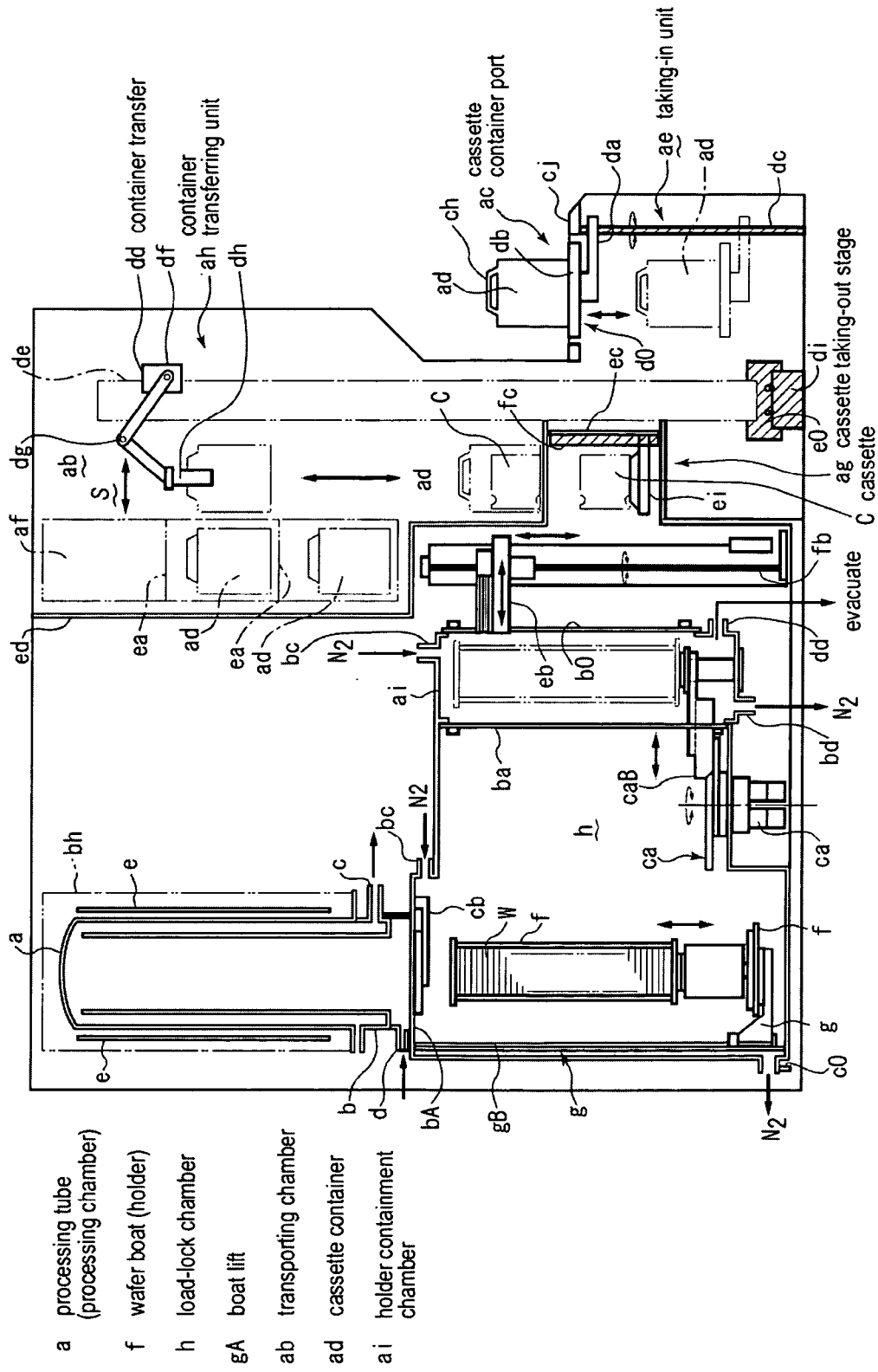
FIG. 2 is a view showing an example of a manufacturing apparatus according to this embodiment.

The manufacturing apparatuses 30 are, for example, batch-type vertical heat treatment apparatuses described in documents such as Japanese Patent No. 3543996 and JP 2002-25997A above. FIG. 2 shows an example of the manufacturing apparatus 30. The manufacturing apparatus 30 is an apparatus configured so as to have a so-called load-lock chamber structure, which is provided with a loading chamber that can be sealed from other chambers and to/from which N2 gas as inert atmosphere can be supplied/evacuated. The manufacturing apparatus 30 has a main portion that is constituted by: a processing tube a serving as a processing chamber for performing a predetermined process on wafers W serving as processing targets; a load-lock chamber h serving as a loading chamber provided with a transfer mechanism g with which a wafer boat f serving as a holder for holding a large number of, for example, 100 wafers W is loaded onto or unloaded from the processing tube a, a transporting chamber ab through which the wafers W are transported out of or into the load-lock chamber h; a cassette container port ac formed on the transporting chamber ab; a taking-in unit ae with which a cassette container ad placed on the port ac is taken into the transporting chamber ab; a container storage stage af on which the taken-in cassette container ad is temporarily stored; a cassette taking-out stage ag for taking out a cassette C contained inside the cassette container ad; a container transferring unit ah with which the cassette container ad is transferred inside the transporting chamber ab; and a holder containment chamber ai in which the wafer boat f disposed between the load-lock chamber h and the transporting chamber ab is contained. In the example of the manufacturing apparatus 30 in FIG. 2, other components and operations are known arts (see Japanese Patent No. 3543996), and thus a detailed description thereof has been omitted. Furthermore, as a chamber constituting the manufacturing apparatus 30, a chamber disclosed in FIG. 1 of JP 2002-25997A is preferable. Furthermore, for example, a recipe that is information relating to a predetermined process on wafers may be stored in the manufacturing apparatus 30, and may be used for control.

Next, the configurations of the client apparatus 10, the server apparatus 20, and the manufacturing apparatus 30 according to this embodiment are described with reference to the block diagrams in FIGS. 3 to 5. In the block diagrams in FIGS. 3 to 5, only characteristic portions in the group management system according to this embodiment are shown and other portions are omitted, but the client apparatus 10, the server apparatus 20, and the manufacturing apparatus 30 may have configurations for performing processing relating to manufacture of a device that has a semiconductor, such as a configuration for transporting processing target substrates in the manufacturing apparatus 30, and a configuration for transmitting temperature, pressure, and the like during a manufacturing process in the manufacturing apparatus 30 to the server apparatus 20.

Figure 3:
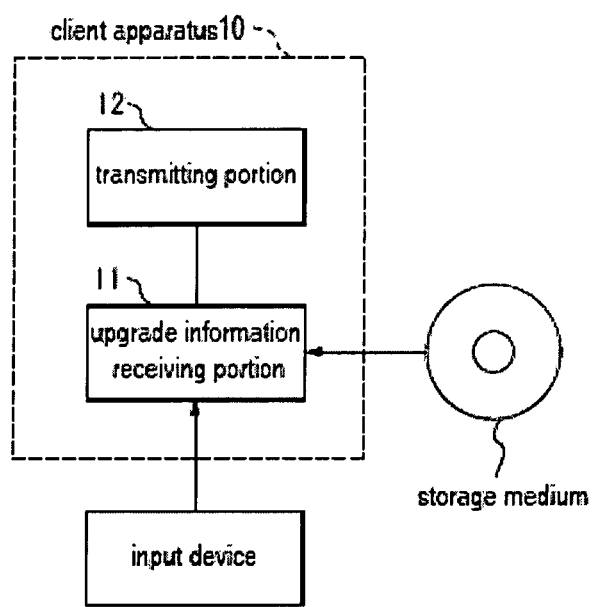
FIG. 3 is a block diagram showing the configuration of a client apparatus according to this embodiment.

FIG. 3 is a block diagram showing the configuration of the client apparatus 10. In FIG. 3, the client apparatus 10 according to this embodiment is provided with an upgrade information receiving portion 11 and a transmitting portion 12.

The upgrade information receiving portion 11 receives upgrade information. The upgrade information is information for upgrading an execution software program for controlling the manufacturing apparatus 30. In the manufacturing apparatus 30, a predetermined semiconductor process and the like are performed on processing target substrates, by executing this execution software. At the time of execution, parameters, recipes, and the like retained in the manufacturing apparatus 30 may be used. The execution software program may be, for example, application software or a device driver of the manufacturing apparatus 30, or a system program of the manufacturing apparatus 30. The system program is a program for controlling a control program of the manufacturing apparatus 30, and examples thereof include a so-called OS (operating system) and middleware.

The upgrade information may be, for example, data for upgrading the execution software program, or an execution program for upgrading the execution software program. Furthermore, as long as the upgrade information is information with which the execution software program can be upgraded, it may be information relating to a difference for upgrading the execution software program, or may be an upgraded execution software program itself, for example. Furthermore, the upgrade information may be one file for upgrading the execution software program, or may be a so-called upgrade kit constituted by multiple files. The upgrade information receiving portion 11 may receive the upgrade information, for example, by receiving information that has been input from an input device (such as a keyboard, a mouse, or a touch panel), by receiving information that has been transmitted via a wired or wireless communication line, or by receiving information that has been read from a predetermined storage medium (such as an optical disk, a magnetic disk, or a semiconductor memory). In this embodiment, it is assumed that the upgrade information receiving portion 11 receives the upgrade information has been read from a storage medium. Herein, the upgrade information receiving portion 11 may or may not include a device for reception (such as a modem or a network card). Furthermore, the upgrade information receiving portion 11 may be implemented as hardware, or may be implemented as software such as a driver for driving a predetermined device.

Furthermore, the upgrade information receiving portion 11 may receive apparatus identification information for identifying the manufacturing apparatus 30 for which the software program is to be upgraded with the upgrade information. The apparatus identification information may be, for example, information for identifying each apparatus, or information for identifying a group constituted by two or more apparatuses. In the latter case, the apparatus identification information may be, for example, information indicating "all apparatuses".

The transmitting portion 12 transmits the upgrade information that has been received by the upgrade information receiving portion 11, via a communication line to the server apparatus 20. The transmitting portion 12, for example, may transmit the upgrade information to the server apparatus 20 using protocols such as FTP (file transfer protocol), or may transmit the upgrade information to the server apparatus 20 using other methods. In a case where the upgrade information receiving portion 11 receives apparatus identification information for identifying the manufacturing apparatus 30 for which the software program is to be upgraded with the upgrade information, then the transmitting portion 12 may transmit also the apparatus identification information to the server apparatus 20.

Herein, the transmitting portion 12 may or may not include a communication device for communication (such as a modem or a network card). Furthermore, the transmitting portion 12 may be implemented as hardware, or may be implemented as software such as a driver for driving a communication device.

Figure 4:
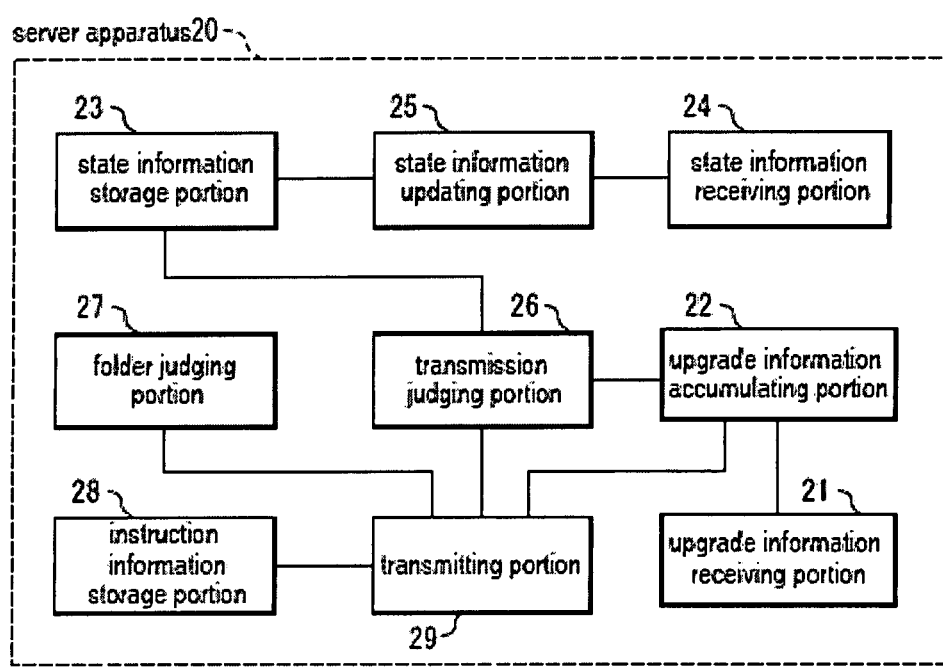
FIG. 4 is a block diagram showing the configuration of a server apparatus according to this embodiment.

FIG. 4 is a block diagram showing the configuration of the server apparatus 20. In FIG. 4, the server apparatus 20 according to this embodiment is provided with an upgrade information receiving portion 21, an upgrade information accumulating portion 22, a state information storage portion 23, a state information receiving portion 24, a state information updating portion 25, a transmission judging portion 26, a folder judging portion 27, an instruction information storage portion 28, and a transmitting portion 29.

The upgrade information receiving portion 21 receives the upgrade information. Herein, the upgrade information receiving portion 21 may receive the upgrade information, for example, by receiving information that has been input from an input device (such as a keyboard, a mouse, or a touch panel), by receiving information that has been transmitted via a wired or wireless communication line, or by receiving information that has been read from a predetermined storage medium (such as an optical disk, a magnetic disk, or a semiconductor memory). In this embodiment, it is assumed that the upgrade information receiving portion 21 receives the upgrade information that has been transmitted from the client apparatus 10 via a communication line. The upgrade information receiving portion 21 may receive the apparatus identification information for identifying the manufacturing apparatus 30 for which the software program is to be upgraded with the upgrade information.

Herein, the upgrade information receiving portion 21 may or may not include a device for reception (such as a modem or a network card). Furthermore, the upgrade information receiving portion 21 may be implemented as hardware, or may be implemented as software such as a driver for driving a predetermined device.

The upgrade information accumulating portion 22 accumulates the upgrade information that has been received by the upgrade information receiving portion 21, in a predetermined storage medium. In a case where the upgrade information receiving portion 21 also receives apparatus identification information for identifying the manufacturing apparatus 30 for which the software program is to be upgraded with the upgrade information, then the apparatus identification information also may be accumulated in a predetermined storage medium in association with the upgrade information. Examples of the storage medium include semiconductor memories, optical disks, and magnetic disks. The storage medium may be in the upgrade information accumulating portion 22, or may be outside the upgrade information accumulating portion 22. This embodiment assumes the former case. Furthermore, in this storage medium, the upgrade information and the like may or may not be temporarily stored.

In the state information storage portion 23, state information, which is information relating to the state of the manufacturing apparatus 30, is stored. The state information, for example, may contain information relating to whether or not the manufacturing apparatus 30 is performing a process, may contain information relating to whether or not the manufacturing apparatus 30 is communicable with the server apparatus 20, may contain information relating to a version of the software program used in the manufacturing apparatus 30, or may contain information relating to other states of the manufacturing apparatus 30. The state information may be information indicating the state of the manufacturing apparatus 30, or may be information from which the state of the manufacturing apparatus 30 can be indirectly found. In the former case, for example, the state information indicates whether or not the manufacturing apparatus 30 is performing a process. In the latter case, for example, the state information indicates that the temperature of the manufacturing apparatus 30 is 300° C., from which it can be indirectly found whether or not the manufacturing apparatus 30 is performing a process. For example, in a case where it is known that the temperature is 200 to 400° C. when the manufacturing apparatus 30 is performing a process, then from the information indicating that the temperature of the manufacturing apparatus 30 is 300° C., it is found that the manufacturing apparatus 30 is performing a process. The state information storage portion 23 may be implemented as a predetermined storage medium (such as a semiconductor memory, a magnetic disk, or an optical disk).

The state information receiving portion 24 receives the state information of the manufacturing apparatus 30. Herein, the state information receiving portion 24 may receive the state information, for example, by receiving information that has been input from an input device (such as a keyboard, a mouse, or a touch panel), by receiving information that has been transmitted via a wired or wireless communication line, or by receiving information that has been read from a predetermined storage medium (such as an optical disk, a magnetic disk, or a semiconductor memory). In this embodiment, it is assumed that the state information receiving portion 24 receives the state information that has been transmitted from the manufacturing apparatus 30 via a communication line. The state information that is received by the state information receiving portion 24 may be the same as, or different from, the state information stored in the state information storage portion 23. In the latter case, for example, information indicating a difference from the state information stored in the state information storage portion 23 may be the state information that is received by the state information receiving portion 24.

Herein, the state information receiving portion 24 may or may not include a device for reception (such as a modem or a network card). Furthermore, the state information receiving portion 24 may be implemented as hardware, or may be implemented as software such as a driver for driving a predetermined device.

The state information updating portion 25 updates the state information stored in the state information storage portion 23, according to the state information that has been received by the state information receiving portion 24. When the state information is updated, the state information stored in the state information storage portion 23 is updated into newer state information of the manufacturing apparatus 30. For example, the state information that is received by the state information receiving portion 24 is the same as the state information stored in the state information storage portion 23, then the state information updating portion 25 may accumulate the state information over the previous state information in the state information storage portion 23. For example, in a case where the state information that is received by the state information receiving portion 24 is a difference from the state information stored in the state information storage portion 23, then the state information updating portion 25 may modify the state information stored in the state information storage portion 23, by the difference. Update of the state information performed by the state information updating portion 25 includes new accumulation of state information in the state information storage portion 23 in which no state information has been stored.

It should be noted that there is no limitation on the timing of the processing in which the state information receiving portion 24 receives the state information, and the state information updating portion 25 updates the state information. For example, the state information may be regularly updated, or the state information may be updated when the transmission judging portion 26 described later makes judgment. In the latter case, an instruction to the effect that state information is to be transmitted may be transmitted from the server apparatus 20 or the like to the manufacturing apparatus 30, and the state information that has been transmitted in response to this instruction may be used for updating state information.

The transmission judging portion 26 judges whether or not to transmit the upgrade information that has been received by the upgrade information receiving portion 21, to the manufacturing apparatus 30, using the state information stored in the state information storage portion 23. The transmission judging portion 26 makes this judgment for each of the manufacturing apparatuses 30. In a case where the upgrade information receiving portion 21 receives the apparatus identification information together with the upgrade information, then the transmission judging portion 26 may make the judgment only for the manufacturing apparatuses 30 that are identified with the apparatus identification information. In a case where the apparatus identification information indicates "all apparatuses", then the transmission judging portion 26 may make the judgment for all of the manufacturing apparatuses 30 that are recognized by the server apparatus 20.

For example, in a case where the state information indicates that the manufacturing apparatus 30 is performing a process, then the transmission judging portion 26 may judge not to transmit the upgrade information to this manufacturing apparatus 30. In a case where the state information indicates that the manufacturing apparatus 30 is not performing a process, then the transmission judging portion 26 may judge to transmit the upgrade information to the manufacturing apparatus 30. The reason for this is to avoid transmission of the upgrade information to the manufacturing apparatus 30 that is performing a process, which negatively influences the process.

In a case where information relating to whether or not the manufacturing apparatus 30 is performing a process, contained in the state information, indicates whether or not the manufacturing apparatus 30 is performing a process, then, using this information, the transmission judging portion 26 can easily judge whether or not the manufacturing apparatus 30 is performing a process. On the other hand, in a case where information relating to whether or not the manufacturing apparatus 30 is performing a process, contained in the state information, is, for example, measurement information such as temperature, pressure, or gas flow rate in the manufacturing apparatus 30, or information indicating the status of the manufacturing apparatus 30, then the transmission judging portion 26 may judge whether or not a condition for the manufacturing apparatus 30 to be performing a process is satisfied, based on the measurement information and the like, and judge whether or not the manufacturing apparatus 30 is performing a process, based on the judgment results. Information indicating the condition may be, for example, "if the status is Standby, Ready, or Idle, then no process is being performed". The information indicating the condition may be retained, for example, in a storage medium (not shown) in the transmission judging portion 26.

The transmission judging portion 26, for example, may judge not to transmit the upgrade information, to the manufacturing apparatus 30 that is indicated by the state information to be incommunicable with the server apparatus 20. The reason for this is not to perform unnecessary transmission of the upgrade information to the manufacturing apparatus 30 with which communication is not possible.

In a case where information relating to whether or not the manufacturing apparatus 30 is communicable with the server apparatus 20, contained in the state information, indicates whether or not communication is possible, then, using this information, the transmission judging portion 26 can easily judge whether or not communication is possible. On the other hand, in a case where information relating to whether or not the manufacturing apparatus 30 is communicable with the server apparatus 20, contained in the state information, is, for example, receipt time of the state information that has been transmitted from the manufacturing apparatus 30, then the transmission judging portion 26 may judge whether or not a condition for the manufacturing apparatus 30 to be communicable with the server apparatus 20 is satisfied, based on the receipt time and the like, and judge whether or not communication is possible, based on the judgment results. The information indicating the condition may be retained, for example, in the storage medium (not shown) in the transmission judging portion 26.

It is also possible to confirm whether or not communication is possible, for example, by transmitting a predetermined packet or the like from the server apparatus 20 to the manufacturing apparatus 30. For example, a ping may be used for this confirmation. In this case, the ping results serve as information relating to whether or not communication is possible, contained in the state information. Thus, the ping results are received by the state information receiving portion 24, and accumulated by the state information updating portion 25 in the state information storage portion 23. Then, using the ping results stored in the state information storage portion 23, the transmission judging portion 26 can judge whether or not communication is possible.

The transmission judging portion 26, for example, may judge not to transmit the upgrade information, to the manufacturing apparatus 30 that is indicated by the state information to be using a software program whose version is the same as or later than the version of the software program upgraded with the upgrade information that has been received by the upgrade information receiving portion 21. In this case, for example, information indicating the version of the software program used in the manufacturing apparatus 30 may be contained in the state information, and used by the transmission judging portion 26 for making the judgment. By making this judgment, it is possible not to perform unnecessary transmission of the upgrade information to the manufacturing apparatus 30 for which the software program does not have to be upgraded.

It should be noted that as long as the transmission judging portion 26 judges whether or not to transmit the upgrade information to the manufacturing apparatus 30, based on whether or not the transmission of the upgrade information is appropriate, judgment other than described herein may be performed.

Furthermore, in a case where the transmission judging portion 26 judges not to transmit the upgrade information to one manufacturing apparatus 30, then after this judgment, the transmission judging portion 26 may judge again whether or not to transmit the upgrade information to the one manufacturing apparatus 30, using the state information. Accordingly, even the manufacturing apparatus 30 to which it has been judged not to transmit the upgrade information may receive the upgrade information at a time when the upgrade information can be transmitted thereto. It should be noted that the transmission judging portion 26 may make the judgment for all or a part of the manufacturing apparatuses 30 to which it has been judged not to transmit the upgrade information.

The folder judging portion 27 judges whether or not a predetermined folder is present in the manufacturing apparatus 30 to which the upgrade information is to be transmitted. The predetermined folder is a folder in which the upgrade information is to be stored, and the position, the name, and the like of the folder have been determined in advance. For example, the folder judging portion 27 may judge whether or not a folder "Upgrade_Program" in which the upgrade information is to be stored is present in a folder "Program_File" of a storage portion of the manufacturing apparatus 30. The folder judging portion 27 may judge whether or not the predetermined folder is present, for example, by transmitting a confirmation request to the manufacturing apparatus 30, and acquiring a reply that has been transmitted from the manufacturing apparatus 30 to the server apparatus 20 in response to the confirmation request, or by accessing the manufacturing apparatus 30 via Telnet or the like, and acquiring the folder structure of the manufacturing apparatus 30.

In a case where the folder judging portion 27 communicates with the manufacturing apparatus 30 via a communication line, then the folder judging portion 27 may or may not contain a communication device for communication (such as a modem or a network card). Furthermore, the folder judging portion 27 may be implemented as hardware, or may be implemented as software such as a driver for driving a communication device.

In the instruction information storage portion 28, instruction information, which is information indicating an instruction to create a predetermined folder, is stored. This predetermined folder is the same as the predetermined folder whose presence is judged by the folder judging portion 27, and is the folder in which the upgrade information is to be stored. In a case where the instruction information is an instruction to create a folder "Upgrade_Program" in which the upgrade information is to be stored, in the folder "Program_File" of a storage portion (herein, assumed to be disk "C") of the manufacturing apparatus 30, then this information is, for example, as follows.

system ("mkdir C Program_File Upgrade_Program")

The instruction information storage portion 28 may be implemented as a predetermined storage medium (such as a semiconductor memory, a magnetic disk, or an optical disk). There is no limitation on the procedure in which the instruction information is stored in the instruction information storage portion 28. For example, the instruction information may be stored in the instruction information storage portion 28 via a storage medium, the instruction information that has been transmitted via a communication line or the like may be stored in the instruction information storage portion 28, or the instruction information that has been input via an input device may be stored in the instruction information storage portion 28.

The transmitting portion 29 transmits the upgrade information that has been received by the upgrade information receiving portion 21, via a communication line, to the manufacturing apparatus 30 to which it has been judged by the transmission judging portion 26 to transmit the upgrade information. The transmitting portion 29, for example, may transmit the upgrade information to the manufacturing apparatus 30 using protocols such as FTP, or may transmit the upgrade information to the manufacturing apparatus 30 using other methods. The transmitting portion 29 may transmit the upgrade information, with an instruction on a folder in which the upgrade information that is to be transmitted is stored, or without such an instruction. In the former case, for example, the upgrade information may be transmitted to the predetermined folder using FTP or the like. In the latter case, it is assumed that the manufacturing apparatus 30 has been notified in advance of the folder in which the upgrade information is to be stored. In a case where the folder judging portion 27 judges that the predetermined folder is not present in the manufacturing apparatus 30, then the transmitting portion 29 may transmit the instruction information stored in the instruction information storage portion 28, via a communication line to the manufacturing apparatus 30. The instruction information may be transmitted simultaneously with or separately from the upgrade information.

Herein, the transmitting portion 29 may or may not include a transmission device for transmission (such as a modem or a network card). Furthermore, the transmitting portion 29 may be implemented as hardware, or may be implemented as software such as a driver for driving a transmission device.

Figure 5:
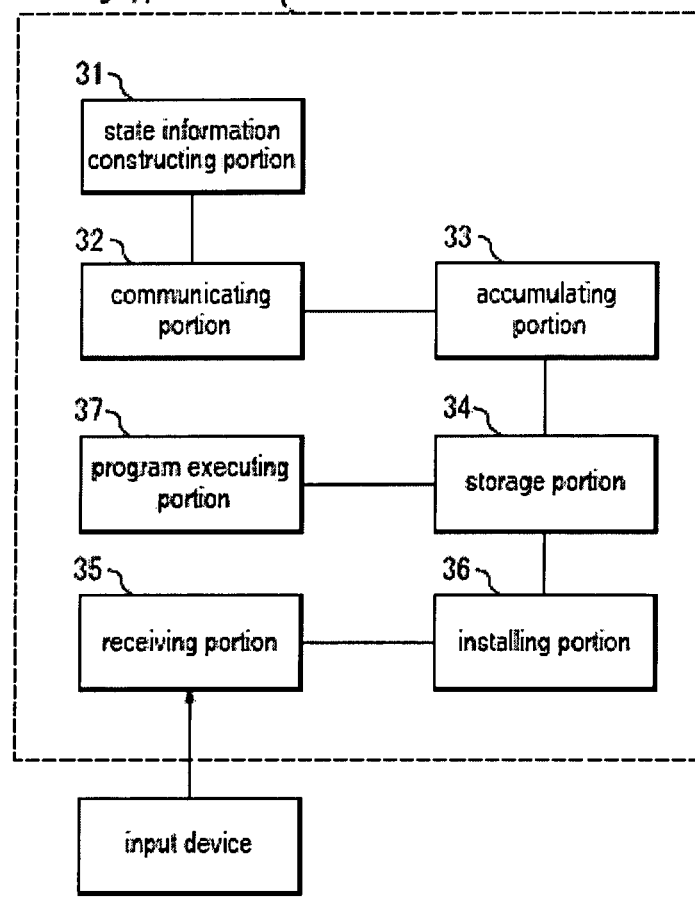
FIG. 5 is a block diagram showing the configuration of a manufacturing apparatus according to this embodiment.

FIG. 5 is a block diagram showing the configuration of the manufacturing apparatus 30. In FIG. 5, the manufacturing apparatus 30 according to this embodiment is provided with a state information constructing portion 31, a communicating portion 32, an accumulating portion 33, a storage portion 34, a receiving portion 35, an installing portion 36, and a program executing portion 37.

The state information constructing portion 31 constructs the state information that is to be transmitted to the server apparatus 20. The state information may be, for example, information indicating whether or not the manufacturing apparatus 30 is performing a process, or information indicating temperature, pressure, or the like of the manufacturing apparatus 30.

The communicating portion 32 transmits the state information that has been constructed by the state information constructing portion 31, via a communication line to the server apparatus 20. Furthermore, the communicating portion 32 receives the upgrade information that has been transmitted from the server apparatus 20 via a communication line. Herein, the communicating portion 32 may or may not include a communication device for communication (such as a modem or a network card). Furthermore, the communicating portion 32 may be implemented as hardware, or may be implemented as software such as a driver for driving a communication device.

The accumulating portion 33 accumulates the upgrade information that has been received by the communicating portion 32, in a predetermined folder of the storage portion 34. The predetermined folder may be a folder on which an instruction is sent from the server apparatus 20, or may be a folder that has been set in advance as a target in which the upgrade information is to be accumulated in the manufacturing apparatus 30.

In the predetermined folder of the storage portion 34, the upgrade information is accumulated by the accumulating portion 33 as described above. Furthermore, it is assumed that in the storage portion 34, a software program that is to be executed by the program executing portion 37 described later is also stored. A semiconductor process in the manufacturing apparatus 30 is performed by executing this software program, so that temperature, pressure, gas flow rate, and the like are controlled, and a predetermined process on processing target substrates is performed. The storage portion 34 may be implemented as a predetermined storage medium (such as a semiconductor memory, a magnetic disk, or an optical disk).

The receiving portion 35 receives an installation instruction that has been input from an input device (such as a keyboard, a mouse, or a touch panel).

The installing portion 36 installs the upgrade information stored in the predetermined folder of the storage portion 34, thereby upgrading the software program. It should be noted that there is no limitation on the timing of this installation. For example, the installing portion 36 may perform the installation at the timing when the upgrade information is accumulated in the storage portion 34, or the installing portion 36 may perform the installation at the time when the manufacturing apparatus 30 is restarted. The installation is preferably performed at the time of restart. The reason for this is that by performing installation at the time of restart, the installation can be safely performed without causing any trouble in the manufacturing apparatus 30. In a case where the installation is performed at the time of restart, the installation may be performed at any step of the restart processing. Furthermore, when the installing portion 36 installs the upgrade information, the installation may be performed after requesting a user of the manufacturing apparatus 30 or the like to judge whether or not the installation is appropriate and receiving an instruction to the effect that the installation is to be performed, or the installation may be automatically performed without requesting a user or the like to make such judgment.

The program executing portion 37 executes the software program stored in the storage portion 34, thereby performing a semiconductor process and the like in the manufacturing apparatus 30. In a case where the installing portion 36 upgrades the software program, then the program executing portion 37 executes the upgraded software program.

It should be noted that although not shown in FIG. 5, the manufacturing apparatus 30 may be provided with components for implementing a function to construct a reply to a confirmation request regarding whether or not a predetermined folder is present, transmitted from the server apparatus 20, or a function to create a predetermined folder in response to the instruction information that has been transmitted from the server apparatus 20.

Next, an operation of the client apparatus 10 according to this embodiment is described with reference to the flowchart of FIG. 6.

(Step S101) The upgrade information receiving portion 11 judges whether or not to transmit the upgrade information at that time to the server apparatus 20. For example, the upgrade information receiving portion 11 may judge that it is time to transmit the upgrade information, when an instruction to the effect that the upgrade information is to be transmitted is received from an input device or the like. If it is time to transmit the upgrade information, then the procedure proceeds to step S102. If not, the processing of step S101 is repeated until the time to transmit the upgrade information.

(Step S102) The upgrade information receiving portion 11 judges whether or not the upgrade information that is to be transmitted to the server apparatus 20 has been received. If the upgrade information has been received, then the procedure proceeds to step S103. If not, the processing of step S102 is repeated until the upgrade information is received.

(Step S103) The upgrade information receiving portion 11 judges whether or not the apparatus identification information of the manufacturing apparatus 30 has been received for which the software program is to be upgraded with the upgrade information that is to be transmitted to the server apparatus 20. If the apparatus identification information has been received, then the procedure proceeds to step S104. If not, the process of step S103 is repeated until the apparatus identification information is received.

(Step S104) The transmitting portion 12 transmits the upgrade information and the apparatus identification information that have been received by the upgrade information receiving portion 11, to the server apparatus 20. The transmitting portion 12, for example, may be notified in advance of the address of the server apparatus 20, and transmit the upgrade information and the like using this address. The procedure returns to step S101.

Figure 6:
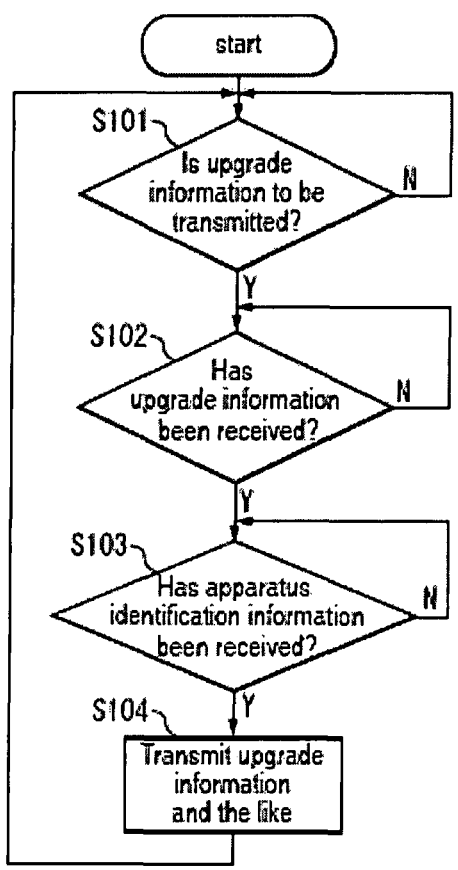
FIG. 6 is a flowchart showing an operation of the client apparatus according to this embodiment.

Note that the processing is ended by powering off or interruption for aborting the processing in the flowchart of FIG. 6. Furthermore, in this flowchart, as long as the upgrade information and the apparatus identification information are received and transmitted, there is no limitation on the order in which the upgrade information and the like are received. Furthermore, the upgrade information and the like retained in advance in the client apparatus 10 and selected by a user may be received.

Next, an operation of the server apparatus 20 according to this embodiment is described with reference to the flowchart of FIG. 7.

(Step S201) The state information receiving portion 24 judges whether or not the state information has been received. If the state information has been received, then the procedure proceeds to step S202. If not, the procedure proceeds to step S203.

(Step S202) The state information updating portion 25 updates the state information stored in the state information storage portion 23, according to the state information that has been received by the state information receiving portion 24. In a case where state information of the manufacturing apparatus 30 that is not stored in the state information storage portion 23 is received, then the state information updating portion 25 newly accumulates the state information in the state information storage portion 23. The procedure returns to step S201.

(Step S203) The upgrade information receiving portion 21 judges whether or not the upgrade information and the apparatus identification information have been received. If the upgrade information and the apparatus identification information have been received, then the procedure proceeds to step S204. If not, the procedure proceeds to step S206.

(Step S204) The upgrade information accumulating portion 22 accumulates the upgrade information and the apparatus identification information that have been received by the upgrade information receiving portion 21, in association with each other, in a storage medium (not shown).

(Step S205) The transmission judging portion 26, the transmitting portion 29, and the like perform transmission processing of the upgrade information. This processing is described later in detail with reference to the flowchart of FIG. 8. The procedure returns to step S201.

(Step S206) The transmission judging portion 26 judges whether or not to retry the transmission processing of the upgrade information that was not transmitted in the previous transmission processing. The transmission judging portion 26, for example, may judge whether or not to retry the transmission processing at a timing of every predetermined period (such as every one hour), or may judge whether or not to retry the transmission processing at a timing triggered by a predetermined event, or may judge to retry the transmission processing at any other time. If it is judged to retry the transmission processing, then the procedure proceeds to step S207. If not, the procedure returns to step S201.

(Step S207) The transmission judging portion 26 judges whether or not untransmitted upgrade information is present. For example, in a case where information relating to the presence of transmission of the upgrade information is managed, then the judgment may be made using this information. This information may be retained, for example, in a storage medium (not shown) in the upgrade information accumulating portion 22, together with the upgrade information and the apparatus identification information. If untransmitted upgrade information is present, then the procedure proceeds to step S208. If not, the procedure returns to step S201.

(Step S208) The transmission judging portion 26, the transmitting portion 29, and the like perform transmission processing of the upgrade information. This processing is described later in detail. The procedure returns to step S201.

Figure 7:
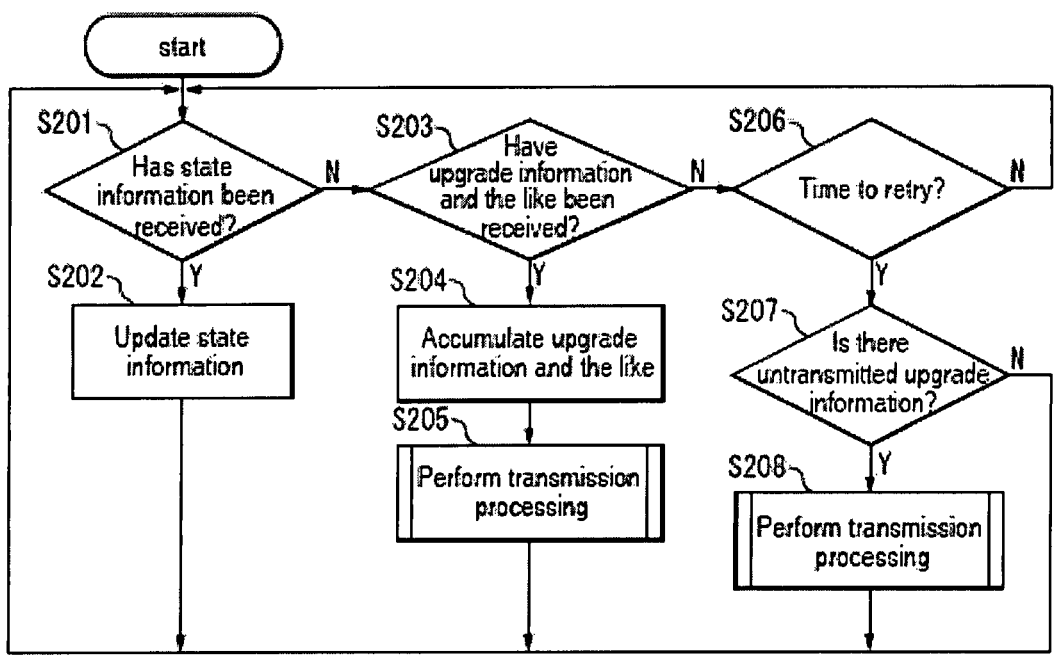
FIG. 7 is a flowchart showing an operation of the server apparatus according to this embodiment.

Note that the processing is ended by powering off or interruption for aborting the processing in the flowchart of FIG. 7.

Figure 8:
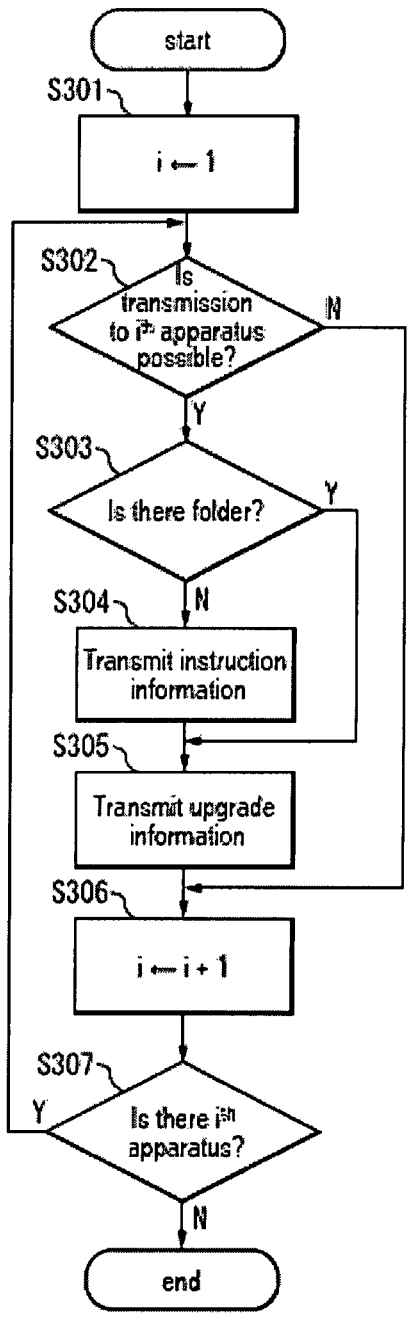
FIG. 8 is a flowchart showing an operation of the server apparatus according to this embodiment.

FIG. 8 is a flowchart showing the detail of the transmission processing in step S205 in the flowchart of FIG. 7.

(Step S301) The transmission judging portion 26 sets a counter i to one.

(Step S302) The transmission judging portion 26 judges whether or not to transmit the upgrade information to the manufacturing apparatus 30 that is identified with the $i^{th}$ apparatus identification information, among the apparatus identification information that has been received by the upgrade information receiving portion 21 and accumulated by the upgrade information accumulating portion 22. This judgment processing is described later in detail with reference to the flowchart of FIG. 9.

(Step S303) The folder judging portion 27 judges whether or not the predetermined folder is present in the manufacturing apparatus 30 that is identified with the $i^{th}$ apparatus identification information. If the predetermined folder is present, then the procedure proceeds to step S305. If the predetermined folder is not present, then the procedure proceeds to step S304.

(Step S304) The transmitting portion 29 reads the instruction information from the instruction information storage portion 28, and transmits the instruction information to the manufacturing apparatus 30 that is identified with the $i^{th}$ apparatus identification information.

(Step S305) The transmitting portion 29 reads the upgrade information from the upgrade information accumulating portion 22, and transmits the upgrade information to the manufacturing apparatus 30 that is identified with the $i^{th}$ apparatus identification information.

(Step S306) The transmission judging portion 26 increments the counter i by one.

(Step S307) The transmission judging portion 26 judges whether or not the $i^{th}$ apparatus identification information is present in the apparatus identification information that has been received by the upgrade information receiving portion 21 and accumulated by the upgrade information accumulating portion 22. If the $i^{th}$ apparatus identification information is present, then the procedure returns to step S302. If not, one iteration of transmission processing of transmitting the upgrade information is ended, and the procedure returns to step S201.

With reference to the flowchart of FIG. 8, a case was described in which when the instruction information is transmitted, the instruction information and the upgrade information are separately transmitted, but the instruction information and the upgrade information may be simultaneously transmitted.

Figure 9:
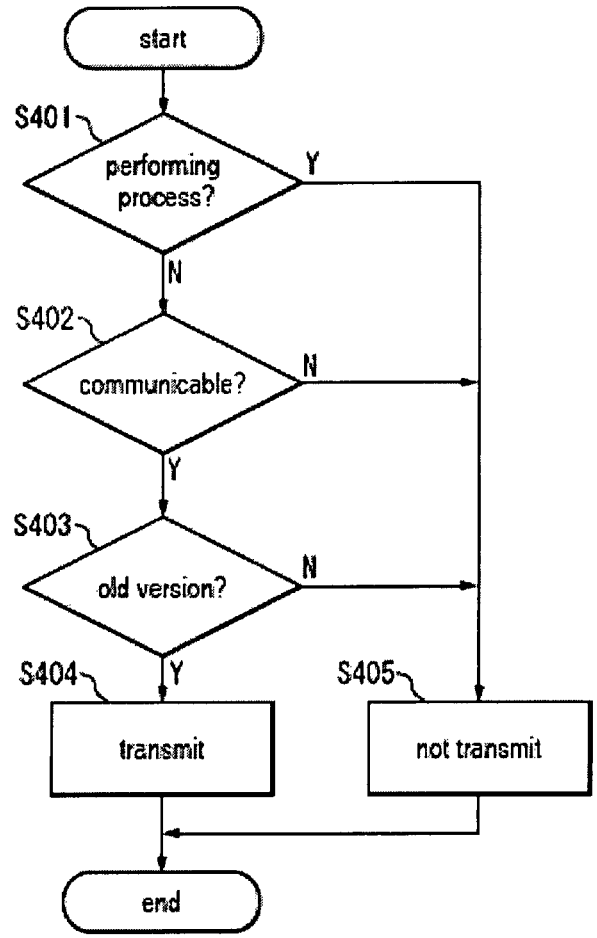
FIG. 9 is a flowchart showing an operation of the server apparatus according to this embodiment.

FIG. 9 is a flowchart showing the detail of the transmission judgment processing in step S302 in the flowchart of FIG. 8.

(Step S401) The transmission judging portion 26 refers to the state information stored in the state information storage portion 23 and corresponding to the manufacturing apparatus 30 that is identified with the $i^{th}$ apparatus identification information, and judges whether or not the manufacturing apparatus 30 is performing a process. If the manufacturing apparatus 30 is performing a process, then the procedure proceeds to step S405. If the manufacturing apparatus 30 is not performing a process, then the procedure proceeds to step S402.

(Step S402) The transmission judging portion 26 refers to the state information stored in the state information storage portion 23 and corresponding to the manufacturing apparatus 30 that is identified with the $i^{th}$ apparatus identification information, and judges whether or not communication with the manufacturing apparatus 30 is possible. If the communication is possible, then the procedure proceeds to step S403. If the communication is not possible, then the procedure proceeds to step S405.

(Step S403) The transmission judging portion 26 refers to the state information stored in the state information storage portion 23 and corresponding to the manufacturing apparatus 30 that is identified with the $i^{th}$ apparatus identification information, compares the version of a software program used in the manufacturing apparatus 30 with the version of a software program upgraded with the latest upgrade information that has been received by the upgrade information receiving portion 21 and accumulated by the upgrade information accumulating portion 22, and judges whether or not the version of the software program used in the manufacturing apparatus 30 is older. If the version of the software program used in the manufacturing apparatus 30 is older, then the procedure proceeds to step S404. If not, the procedure proceeds to step S405.

(Step S404) The transmission judging portion 26 judges to transmit the upgrade information to the manufacturing apparatus 30 that is identified with the $i^{th}$ apparatus identification information. The procedure proceeds to step S303.

(Step S405) The transmission judging portion 26 judges not to transmit the upgrade information to the manufacturing apparatus 30 that is identified with the $i^{th}$ apparatus identification information. The procedure proceeds to step S306.

The detail of the transmission processing in step S208 in the flowchart of FIG. 7 is substantially similar to that in the flowchart of FIG. 8, and thus a detailed description thereof has been omitted. It should be noted that in step S302 in the flowchart of FIG. 8, the manufacturing apparatuses 30 to which it is judged whether or not to transmit the upgrade information are all or a part of the manufacturing apparatuses 30 to which it has been judged not to transmit the upgrade information in the foregoing judgment processing.

Next, an operation of the manufacturing apparatus 30 according to this embodiment is described with reference to the flowchart of FIG. 10.

(Step S501) The communicating portion 32 judges whether or not the upgrade information has been received. If the upgrade information has been received, then the procedure proceeds to step S502. If not, the procedure proceeds to step S503.

(Step S502) The accumulating portion 33 accumulates the upgrade information that has been received by the communicating portion 32, in the storage portion 34. In a case where the predetermined folder in which the upgrade information is to be accumulated is specified by the server apparatus 20 or set in advance in the manufacturing apparatus 30, then the accumulating portion 33 accumulates the upgrade information in that folder. The procedure returns to step S501.

(Step S503) The installing portion 36 judges whether or not it is time to perform an upgrade. This timing, for example, may be at every predetermined period (such as at 2 a.m. every day), may be triggered by a predetermined event (such as a restart of the manufacturing apparatus 30), or may be at other times. If it is time to perform an upgrade, then the procedure proceeds to step S504. If not, the procedure proceeds to step S507.

(Step S504) The installing portion 36 judges whether or not the upgrade information that has not been installed is stored in the storage portion 34. If such upgrade information is stored, then the procedure proceeds to step S505. If not, the procedure returns to step S501.

(Step S505) The installing portion 36 judges whether or not the receiving portion 35 has received an instruction to the effect that the upgrade information is to be installed. If the receiving portion 35 has received an instruction to the effect that the upgrade information is to be installed, then the procedure proceeds to step S506. If the receiving portion 35 has received an instruction to the effect that the upgrade information is not to be installed, then the procedure returns to step S501.

(Step S506) The installing portion 36 installs the upgrade information stored in the storage portion 34, thereby upgrading the software program of the manufacturing apparatus 30. The procedure returns to step S501. It should be noted that after this installation, the upgrade information used in the installation may be deleted from the storage portion 34, or a flag or the like may be set thereon to the effect that the upgrade information has been installed. After this installation, the program executing portion 37 executes the upgraded software program.

(Step S507) The state information constructing portion 31 judges whether or not it is time to transmit the state information. The timing of transmission of the state information, for example, may be at every predetermined period (such as every ten minutes), may be triggered by a predetermined event (such as when the state of the manufacturing apparatus 30 is modified, or when an instruction to the effect that the state information is to be transmitted is received by the manufacturing apparatus 30), or may be at other times. If it is time to transmit the state information, then the procedure proceeds to step S508. If not, the procedure returns to step S501.

(Step S508) The state information constructing portion 31 constructs the state information that is to be transmitted to the server apparatus 20. It is assumed that that the contents of information that is to be transmitted as this state information are determined in advance. For example, the state information constructing portion 31 may construct the state information only from items changed from those in the previously transmitted state information, or may construct the state information from all items contained in the state information managed in the server apparatus 20.

(Step S509) The communicating portion 32 transmits the state information that has been constructed by the state information constructing portion 31, to the server apparatus 20. The procedure returns to step S501.

Figure 10:
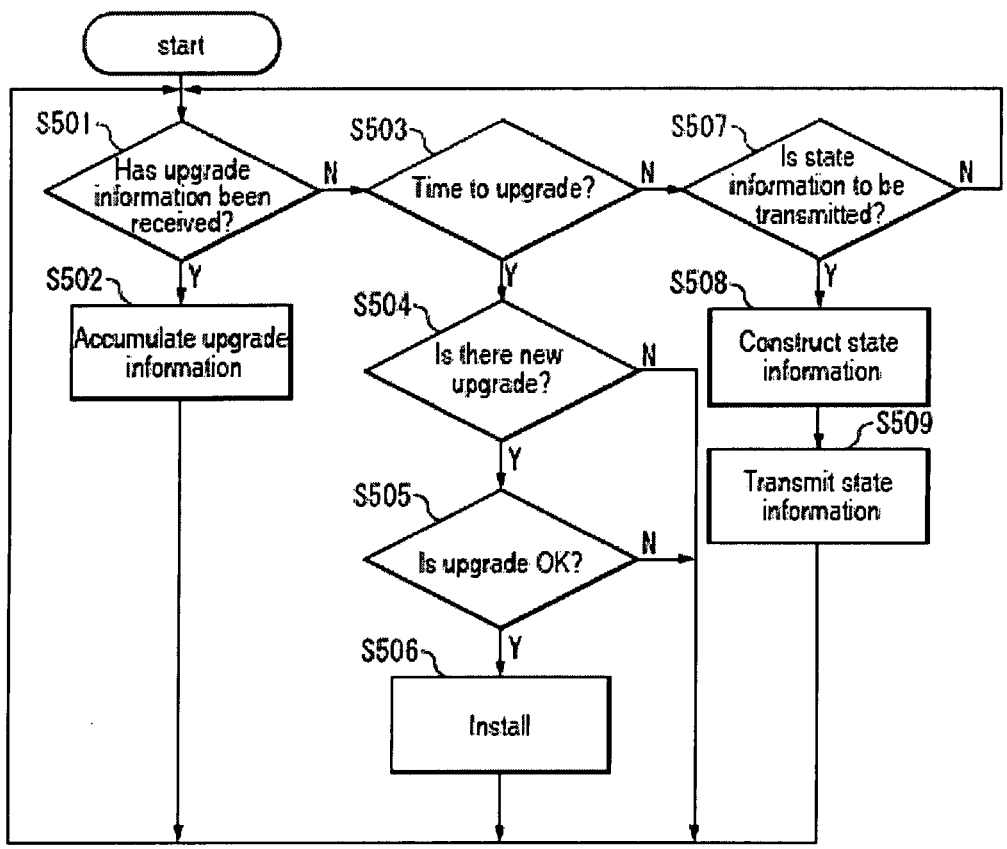
FIG. 10 is a flowchart showing an operation of the manufacturing apparatus according to this embodiment.

Note that the processing is ended by powering off or interruption for aborting the processing in the flowchart of FIG. 10. Furthermore, with reference to the flowchart of FIG. 10, it was described that installation is performed if an instruction to the effect that the upgrade information is to be installed has been received (step S505), but installation may be automatically performed if the upgrade information that has not been installed is present.

Furthermore, although not shown in the flowchart of FIG. 10, it is assumed that in a case where there is an inquiry from the server apparatus 20 to the manufacturing apparatus 30 as to whether or not the predetermined folder is present, then a reply corresponding to the inquiry is given by the manufacturing apparatus 30. Furthermore, it is assumed that in a case where the instruction information indicating an instruction to create a predetermined folder is transmitted from the server apparatus 20 and received by the manufacturing apparatus 30, then the predetermined folder is created in response to the instruction information.

Next, operations of the group management system according to this embodiment are described using specific examples.

First, an operation is described in which the state information is updated in the server apparatus 20. Herein, it is assumed that in the state information storage portion 23 in the server apparatus 20, the state information shown in FIG. 11 is stored. In the state information shown in FIG. 11, apparatus identification information for identifying the manufacturing apparatus 30, a processing flag indicating whether or not a process is being performed, a communicable flag indicating whether or not communication with the server apparatus 20 is possible, and the version of a software program used in the manufacturing apparatus 30 are associated with each other. The processing flag "1" indicates that a process is being performed, and the processing flag "0" indicates that a process is not being performed. Furthermore, the communicable processing flag "1" indicates that communication is possible, and the communicable flag "0" indicates that communication is not possible.

In this specific example, it is assumed that the state information of the manufacturing apparatus 30 is transmitted from the manufacturing apparatus 30 to the server apparatus 20 every ten minutes. In the server apparatus 20, the received state information is used for updating stored state information. In the update, in a case where the state information is not received for ten minutes or longer, then it is judged that communication is not possible between the manufacturing apparatus 30 and the server apparatus 20 for some reasons, and the communicable flag corresponding to the apparatus identification information for identifying the manufacturing apparatus 30 is set to "0" by the state information updating portion 25.

The manufacturing apparatus 30 that is identified with apparatus identification information "D001" measures the time with a timer after transmitting the state information, and judges that it is time to transmit the state information at the moment when the timer value is "ten minutes" (step S507). In a case where the manufacturing apparatus 30 at that moment has ended a process, and the version of the software program is "020", then the state information constructing portion 31 constructs state information containing the apparatus identification information "D001" and this state, and passes the state information to the communicating portion 32 (step S508). It is assumed that the apparatus identification information of the manufacturing apparatus 30 is retained in advance in a storage medium (not shown) in the manufacturing apparatus 30.

Figure 12:
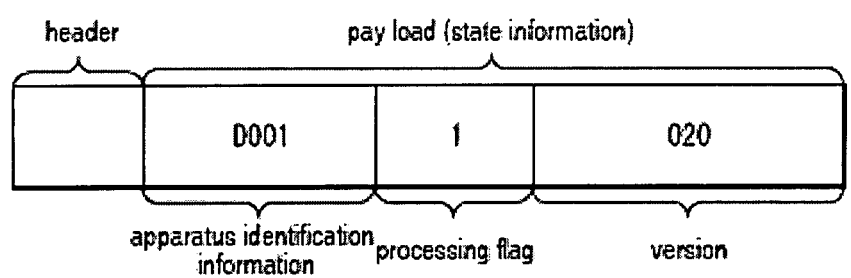
FIG. 12 is a diagram showing an example of state information transmitted from the manufacturing apparatus in this embodiment.

The communicating portion 32 constructs a packet containing the state information that has been received from the state information constructing portion 31 as shown in FIG. 12, and transmits the packet to a predetermined address of the server apparatus 20 (step S509).

This packet is transmitted via a communication line, and received by the state information receiving portion 24 in the server apparatus 20 (step S201). The state information updating portion 25 updates the state information stored in the state information storage portion 23, according to the state information that has been received by the state information receiving portion 24 (step S202). More specifically, in the state information, the processing flag associated with the apparatus identification information "D001" is updated to "0". Since there is no change in the version, the version is not updated.

As a result of the update, the state information stored in the state information storage portion 23 is as shown in FIG. 13.

In this manner, the state information is regularly transmitted from the manufacturing apparatus 30 to server apparatus. It is assumed that the state information is transmitted to the server apparatus 20 in a similar manner, also from the manufacturing apparatuses 30 other than the manufacturing apparatus 30 that is identified with the apparatus identification information "D001".

Next, an operation is described in which the upgrade information is transmitted from the client apparatus 10 to the server apparatus 20, and the upgrade information is then transmitted to the manufacturing apparatus 30.

First, a user operating the client apparatus 10 starts an application for transmitting the upgrade information to the server apparatus 20. Then, the upgrade information receiving portion 11 judges that it is time to transmit the upgrade information (step S101). Then, an instruction to the user is output to a display, the instruction being to the effect that a storage medium having the upgrade information is to be attached to the client apparatus 10.

When the storage medium having the upgrade information is attached to the client apparatus 10 in response to the instruction, the upgrade information receiving portion 11 reads upgrade information "upgrade_v021.exe" from the storage medium (step S102). It should be noted that "v021" in the file name of this upgrade information refers to the version of the software program.

Furthermore, in the manufacturing apparatus 30, an instruction to the user is output to a display, the instruction being to the effect that apparatus identification information of the manufacturing apparatus 30 to which the upgrade information is transmitted is to be input. Once the user inputs the apparatus identification information "D001", "D002", "D003", and "D004" of the manufacturing apparatuses 30 using an input device according to this instruction, the apparatus identification information is received by the upgrade information receiving portion 11 (step S103). Then, the transmitting portion 12 transmits the upgrade information and the apparatus identification information to the predetermined address of the server apparatus 20 (step S104).

The upgrade information and the apparatus identification information that have been transmitted from the client apparatus 10 are received by the upgrade information receiving portion 21 in the server apparatus 20 (step S203). Then, the upgrade information accumulating portion 22 accumulates the upgrade information and the apparatus identification information in association with each other in a storage medium (not shown) (step S204). FIG. 14 is a diagram showing the apparatus identification information and the upgrade information that have been thus accumulated. It should be noted that as shown in FIG. 14, in the storage medium (not shown) in the upgrade information accumulating portion 22, a transmitted flag, apparatus identification information, and upgrade information are stored in association with each other. The transmitted flag is information indicating whether or not the upgrade information has been transmitted to the manufacturing apparatus 30 that is indicated with the apparatus identification information. The transmitted flag "0" indicates that the upgrade information has not been transmitted, and the transmitted processing flag "1" indicates that the upgrade information has been transmitted. When the upgrade information accumulating portion 22 accumulates the upgrade information and the like, the upgrade information has not been transmitted, and thus all transmitted flags are set to 0.

Once the upgrade information accumulating portion 22 accumulates the upgrade information and the like, the transmission judging portion 26 and the like start transmission processing (step S205). More specifically, the transmission judging portion 26 judges whether or not to transmit the upgrade information to the manufacturing apparatus 30 that is identified with the first apparatus identification information "D001" corresponding to the newly accumulated upgrade information "upgrade_v021.exe" (steps S301 and S302).

First, the transmission judging portion 26 refers to the state information shown in FIG. 13, stored in the state information storage portion 23. Since the processing flag is 0, the transmission judging portion 26 judges that the manufacturing apparatus 30 is not performing a process (step S401). Furthermore, since the communicable flag is 1, the transmission judging portion 26 judges that communication with the manufacturing apparatus 30 is possible (step S402). Furthermore, since the version of the software upgraded with the upgrade information is "021", and the current version of the software program of the manufacturing apparatus 30 is "020", it is judged that the current version of the software program is older (step S403). As a result, the transmission judging portion 26 judges to transmit the upgrade information (step S404).

Herein, it is assumed that the upgrade information is stored in the folder "Upgrade_Program" that is present in the folder "Program_File" of the storage portion 34 in the manufacturing apparatus 30. Thus, the folder judging portion 27 accesses the manufacturing apparatus 30 that is identified with the apparatus identification information "D001", and judges whether or not the folder "Upgrade_Program" is present in the folder "Program_File" of the storage portion 34. It is assumed that in this case, the folder is not present (step S303). Then, the transmitting portion 29 reads the instruction information stored in advance, from the instruction information storage portion 28, and transmits the instruction information to the manufacturing apparatus 30 that is identified with the apparatus identification information "D001". In the server apparatus 20, for example, the apparatus identification information and the IP address shown in FIG. 15 are retained in association with each other. Using this information, the transmitting portion 29 reads out an IP address "192.168.0.1" corresponding to the apparatus identification information "D001", and transmits the instruction information, taking this IP address as the address of a transmission destination (step S304). It is assumed that in the manufacturing apparatus 30 that has received the instruction information, the folder "Upgrade_Program" is created in the folder "Program_File" of the storage portion 34.

Subsequently, the transmitting portion 29 reads the upgrade information "upgrade_v021.exe", from the storage medium (not shown) in the upgrade information accumulating portion 22, and transmits the upgrade information, taking the IP address corresponding to the apparatus identification information "D001" as the address of a transmission destination (step S305). It is assumed that when the upgrade information is transmitted, information specifying a folder in which the upgrade information is to be accumulated is also transmitted. Furthermore, it is assumed that after the upgrade information is transmitted, the transmitted flag is updated to the flag shown in FIG. 16.

Subsequently, the transmission judging portion 26 in the server apparatus 20 judges whether or not to transmit the upgrade information to the manufacturing apparatus 30 that is identified with the second apparatus identification information "D002" (steps S306, S307, and 302). In this case, since the current version of the software program of the manufacturing apparatus 30 is "021" (see FIG. 13), which is not old (step S403), it is judged not to transmit the upgrade information (step S405).

Furthermore, since the processing flag of the manufacturing apparatus 30 that is identified with the third apparatus identification information "D003" is 1 (see FIG. 13), it is judged that a process is being performed (step S401), and it is judged not to transmit the upgrade information (step S405).

Furthermore, since the communicable flag of the manufacturing apparatus 30 that is identified with the fourth apparatus identification information "D004" is 0 (see FIG. 13), it is judged that communication is not possible (step S402), and it is judged not to transmit the upgrade information (step S405). In this manner, one iteration of transmission processing is ended (steps S306 and S307).

Next, the manufacturing apparatus 30 that has received the upgrade information is described. The upgrade information and the like transmitted from the server apparatus 20 to the manufacturing apparatus 30 that is identified with the apparatus identification information "D001" are received by the communicating portion 32 (step S501), and the accumulating portion 33 accumulates the upgrade information in a specified folder (step S502).

Figure 17:
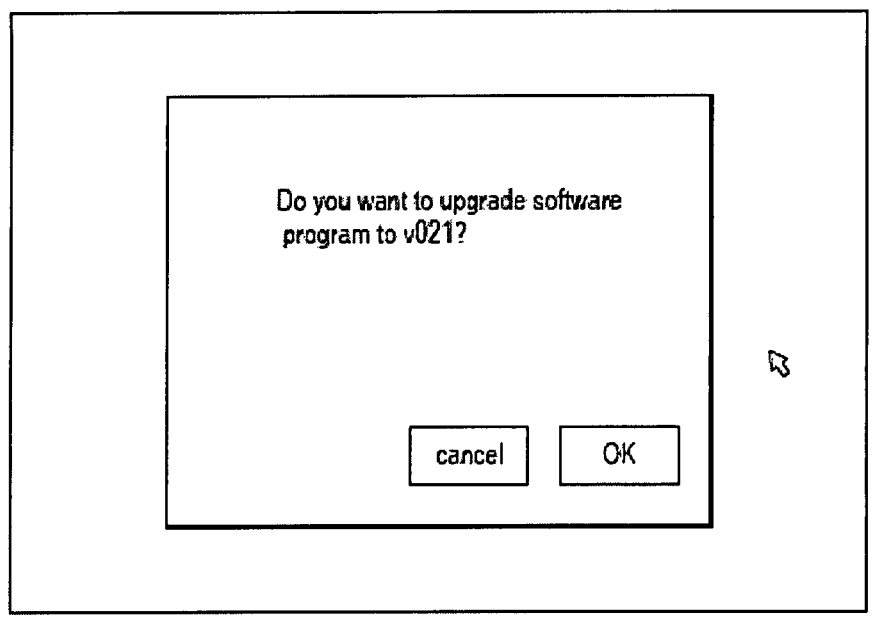
FIG. 17 is a view showing an example of a display on the manufacturing apparatus in this embodiment.

Subsequently, at the timing when the manufacturing apparatus 30 is restarted, the installing portion 36 judges whether to perform an upgrade (step S503). Furthermore, since the upgrade information "upgrade_v021.exe" is present in the folder "Upgrade_Program" in the folder "Program_File" of the storage portion 34, the installing portion 36 judges that new upgrade information is present (step S504). Then, the message shown in FIG. 17 is output to a display of the manufacturing apparatus 30, and an instruction from the manufacturing apparatus 30 is waited for. When the user of the manufacturing apparatus 30 uses a mouse to click an "OK" button for the message in FIG. 17, the installing portion 36 judges that an instruction to the effect that an upgrade is to be performed is received by the receiving portion 35 (step S505), and thus the upgrade information is installed, and the version of the software program of the manufacturing apparatus 30 is upgraded to "021" (step S506). In the manufacturing apparatus 30 that has been restarted, processing such as a process is performed with the upgraded software program. It is assumed that the upgrade information "upgrade_v021.exe" stored in the storage portion 34 is deleted together with the folder "Upgrade_Program" after the installation.

Next, transmission judgment is described that is performed again on the manufacturing apparatus 30 to which it has been judged not to transmit the upgrade information.

The transmission judging portion 26 starts to measure the time with a timer at the moment when the upgrade information is transmitted to the manufacturing apparatus 30 that is identified with the apparatus identification information "D001", and judges to retry the transmission processing of the upgrade information that was not transmitted in the previous transmission processing, at the moment when the timer value is "one hour" (step S206). The transmission judging portion 26 refers to the table shown in FIG. 16, and judges that untransmitted upgrade information is present because the transmitted flag "0" is present (step S207).

Subsequently, the transmission judging portion 26 performs transmission processing relating to transmission of the upgrade information "upgrade_v021.exe" to the manufacturing apparatuses 30 that are identified with the apparatus identification information "D002", "D003", and "D004" (step S208). It should be noted that this transmission processing is similar to the above-described transmission processing, and thus a description thereof has been omitted.

In this specific example, a case was described in which one piece of upgrade information is transmitted from the client apparatus 10 to the server apparatus 20, and the one piece of upgrade information is transmitted from the server apparatus 20 to the manufacturing apparatus 30 based on the transmission judgment results, but, for example, the upgrade information as a so-called upgrade kit containing multiple files may be transmitted from the client apparatus 10 to the server apparatus 20, and the upgrade information containing the multiple files may be transmitted from the server apparatus 20 to the manufacturing apparatus 30 based on the transmission judgment results. In this case, in the server apparatus 20, for example, transmission judgment may be made on each of the files contained in the upgrade information, or transmission judgment may be made all at once on the upgrade information containing the multiple files.

In this specific example, a case was described in which the judgment is made again on all of the manufacturing apparatuses 30 to which it has been judged in transmission judgment not to transmit the upgrade information, but the judgment may be made again on a part of the manufacturing apparatuses 30 to which it has been judged in transmission judgment not to transmit the upgrade information. For example, in a case where it is judged not to transmit the upgrade information because the manufacturing apparatus 30 already uses a software program whose version is the same as or later than the version of the software program upgraded with the upgrade information that is to be transmitted, then even if the judgment is made again later, the judgment results will not change, and thus the judgment does not have to be made again if it is judged not to perform transmission because of the above-described reason.

Furthermore, in this specific example, once the upgrade information is transmitted from the server apparatus 20 to the manufacturing apparatus 30, information indicating the manufacturing apparatus 30 to which the upgrade information has been transmitted may be transmitted from the server apparatus 20 to the client apparatus 10. Accordingly, the user of the client apparatus 10 can be notified of the manufacturing apparatus 30 to which the upgrade information has been transmitted.

Furthermore, in this specific example, in a case where when the upgrade information is transmitted from the server apparatus 20 to the manufacturing apparatus 30, an unnecessary file is present in the predetermined folder in which the upgrade information transmitted from the server apparatus 20 to the manufacturing apparatus 30 is to be accumulated, then the unnecessary file may be deleted. The process of deleting the unnecessary file may be performed by the server apparatus 20 accessing the manufacturing apparatus 30, or by the server apparatus 20 transmitting an instruction to the manufacturing apparatus 30 to the effect that the unnecessary file is to be deleted, or may be performed when the manufacturing apparatus 30 receives the upgrade information.

As described above, with the group management system according to this embodiment, it is possible to upgrade an execution software program for controlling the manufacturing apparatus 30, by transmitting the upgrade information from the server apparatus 20 to the manufacturing apparatus 30. Thus, the advantage is obtained that an operator does not have to perform a complicated and time-consuming process for upgrading the software program of the manufacturing apparatuses 30 as in conventional examples.

The server apparatus 20 judges whether or not to transmit the upgrade information, and transmits the upgrade information if judging to perform transmission. Thus, in a case where transmission is inappropriate, transmission of the upgrade information can be avoided, and an appropriate upgrade of the software program can be implemented. For example, in a case where the manufacturing apparatus 30 is performing a process, it is possible not to transmit the upgrade information.

Furthermore, it seems that when the execution software program is a system program, the volume of the upgrade information is generally large. Thus, it seems that the manufacturing apparatus 30 is greatly affected by transmission of the upgrade information. In this case, it is effective to judge whether or not to transmit the upgrade information, and transmit the upgrade information based on the judgment results.

It should be noted that the transmission judging portion 26 may perform judgment other than described above. For example, if at least a certain ratio of the manufacturing apparatuses 30 or at least a certain number of the manufacturing apparatuses 30, among all of the manufacturing apparatuses 30, are performing a process, then the transmission judging portion 26 may judge not to transmit the upgrade information. If not, the transmission judging portion 26 may judge to transmit the upgrade information. For example, the volume of the upgrade information may be very large. If such upgrade information is transmitted to the manufacturing apparatus 30 that is not performing a process, then the transmission of the upgrade information occupies a very large volume of communication lines, so that the volume of the communication lines necessary for other manufacturing apparatuses 30 that are performing a process cannot be secured, and thus communication necessary for that process may be disturbed. Thus, as described above, such a situation can be avoided by judging not to transmit the upgrade information, in a case where at least a certain ratio of the manufacturing apparatuses 30 or at least a certain number of the manufacturing apparatuses 30 are performing a process. It should be noted that the certain number or the certain ratio preferably may be set to appropriate values in consideration of the volume of communication lines and the volume of communication necessary for the manufacturing apparatuses 30 that are performing a process.

Furthermore, the server apparatus 20 in the group management system according to this embodiment may simply receive the upgrade information and transmit the upgrade information to the manufacturing apparatus 30 based on the judgment results as to whether or not to perform transmission. Thus, in addition to the server apparatus 20, a server apparatus may be provided that performs other processing in the group management system. Examples of the processing include processing of performing a process in response to a request from the client apparatus 10, and of transmitting the process results to the client apparatus 10, and processing of accumulating various measurement information transmitted from the manufacturing apparatus 30.

In this embodiment, it was described that the folder judging portion 27 judges whether or not the predetermined folder is present, and if the predetermined folder is not present, then the instruction information is transmitted, but the instruction information may be transmitted without judging whether or not the predetermined folder is present. In this case, the server apparatus 20 does not have to be provided with the folder judging portion 27. In the manufacturing apparatus 30 that has received the instruction information, if the predetermined folder is present, then an error is received regarding the instruction information, and if the predetermined folder is not present, then the predetermined folder is created.

In this embodiment, a case was described in which the instruction information is transmitted, but if it is not necessary to specify a folder in which the upgrade information is to be stored, or if it is certain that the predetermined folder is present in the manufacturing apparatus 30, then it is not necessary to transmit the instruction information from the server apparatus 20. In this case, the server apparatus 20 does not have to be provided with the folder judging portion 27 or the instruction information storage portion 28.

Embodiment 2

Herein, a group management system according to Embodiment 2 of the present invention is described with reference to the drawings. In the group management system according to this embodiment, the state information is updated during transmission of the upgrade information, and in a case where it is judged to cancel the transmission of the upgrade information, the transmission of the upgrade information is cancelled.

It should be noted that the configuration of the group management system according to this embodiment, and the configurations of the client apparatus 10, the server apparatus 20, and the N manufacturing apparatuses 30 included in the group management system are similar to those in FIGS. 1 to 5 in Embodiment 1, and thus a description thereof has been omitted. Furthermore, except for an operation relating to transmission of the upgrade information, the operations of the apparatuses are similar to those in the flowcharts of FIGS. 6 to 10 in Embodiment 1, and thus a description thereof has been omitted.

Figure 18:
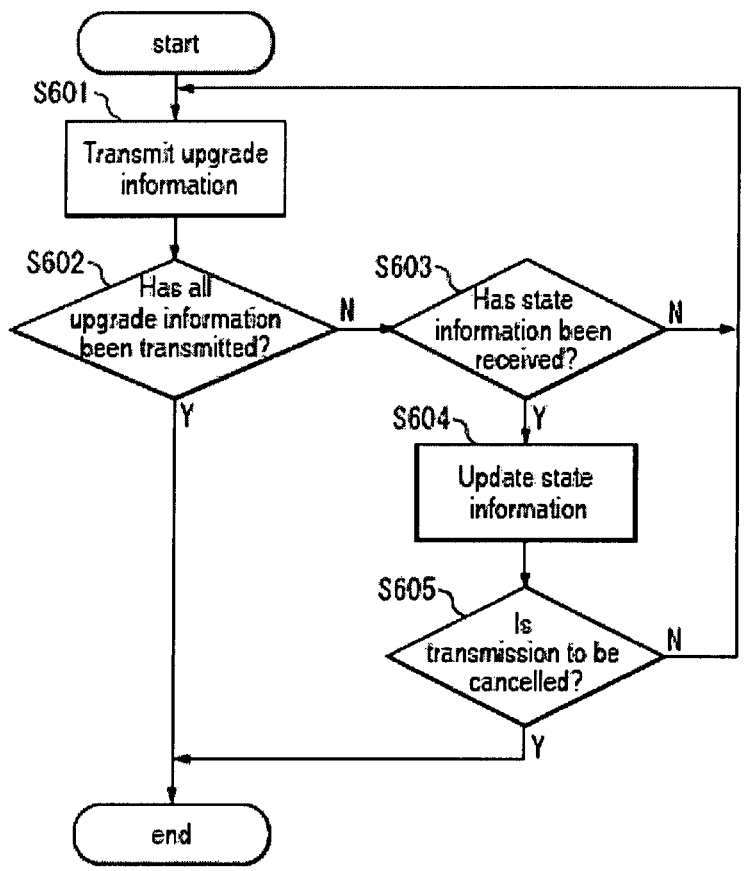
FIG. 18 is a flowchart showing an operation of a server in Embodiment 2 of the present invention.

FIG. 18 is a flowchart showing the detail of transmission processing of the upgrade information in this embodiment. More specifically, FIG. 18 is a chart showing the detail of the processing in step S305 in the flowchart of FIG. 8.

(Step S601) The transmitting portion 29 in the server apparatus 20 transmits the upgrade information to the manufacturing apparatus 30 as a transmission destination. For example, the processing in this step may be to transmit one or several packets relating to the upgrade information.

(Step S602) The transmitting portion 29 judges whether or not all of the upgrade information has been transmitted. If all of the upgrade information has been transmitted, then there is no more upgrade information to be transmitted, and thus the procedure returns to the flowchart of FIG. 8. If the upgrade information that is to be transmitted still remains, then the procedure proceeds to step S603.

(Step S603) The state information receiving portion 24 judges whether or not the state information has been received. If the state information has been received, then the procedure proceeds to step S604. If not, the procedure returns to step S601.

(Step S604) The state information updating portion 25 updates the state information stored in the state information storage portion 23, according to the state information that has been received by the state information receiving portion 24. In a case where state information of the manufacturing apparatus 30 that is not stored in the state information storage portion 23 is received, then the state information updating portion 25 newly accumulates the state information in the state information storage portion 23.

(Step S605) The transmission judging portion 26 judges whether the transmission of the upgrade information can be continued, or has to be cancelled. If the transmission of the upgrade information can be continued, then the procedure returns to step S601. If the transmission of the upgrade information has to be cancelled, then the transmitting portion 29 cancels the transmission of the upgrade information, and the procedure returns to the flowchart of FIG. 8.

Herein, judgment in step S605 is described. When the transmitting portion 29 is transmitting the upgrade information, in a case where it is detected based on the state information that the manufacturing apparatus 30 as a transmission destination of the upgrade information has started a process, then the transmission judging portion 26 may judge to cancel the transmission of the upgrade information. During the transmission of the upgrade information, in a case where the transmission judging portion 26 judges to cancel the transmission of the upgrade information, then the transmitting portion 29 may cancel the transmission of the upgrade information. Information indicating a condition of whether or not to cancel the transmission of the upgrade information may be retained, for example, in a storage medium (not shown) in the transmission judging portion 26.

Furthermore, when the transmitting portion 29 is transmitting the upgrade information, in a case where it is detected based on the state information that at least a certain ratio of the manufacturing apparatuses 30 or at least a certain number of the manufacturing apparatuses 30 have started a process, then the transmission judging portion 26 may judge to cancel the transmission of the upgrade information. During the transmission of the upgrade information, in a case where the transmission judging portion 26 judges to cancel the transmission of the upgrade information, then the transmitting portion 29 may cancel the transmission of the upgrade information. Information indicating a condition of whether or not to cancel the transmission of the upgrade information may be retained, for example, in a storage medium (not shown) in the transmission judging portion 26. It should be noted that the certain number or the certain ratio preferably may be set to appropriate values in consideration of the volume of communication lines and the volume of communication necessary for the manufacturing apparatuses 30 that are performing a process. The certain number may be a number of 1 or more.

Herein, a specific example of the operation shown in FIG. 18 is briefly described. First, an operation is described in which during the transmission of the upgrade information, in a case where the manufacturing apparatus 30 as a transmission destination has started a process, then the transmission of the upgrade information is cancelled.

It is assumed that the state information is as shown in FIG. 13, and that transmission of upgrade information "upgrade_v021.exe" is started from the server apparatus 20 to the manufacturing apparatus 30 that is identified with apparatus identification information "D001" (step S601). Then, at the moment when a certain amount of data of the upgrade information has been transmitted, the state information is transmitted from the manufacturing apparatus 30, and received by the state information receiving portion 24 (steps S602 and S603), and the state information is updated by the state information updating portion 25 (step S604). It is assumed that the updated state information is as shown in FIG. 11. Since the manufacturing apparatus 30 that is identified with the apparatus identification information "D001" has started a process, the transmission judging portion 26 judges to cancel the transmission of the upgrade information, and the transmission of the upgrade information performed by the transmitting portion 29 is cancelled (step S605).

In a case where it is judged to perform the transmission processing again (step S206), the transmission is performed again as long as conditions that enable the transmission are satisfied, as in Embodiment 1. When transmitting the upgrade information again, for example, it is possible to transmit all of the upgrade information, or it is also possible to transmit only untransmitted portions without transmitting portions that have been already transmitted.

Next, an operation is described in which during the transmission of the upgrade information, in a case at least a certain ratio of the manufacturing apparatuses 30 or at least a certain number of the manufacturing apparatuses 30 connected to the communication lines of the group management system have started a process, then the transmission of the upgrade information is cancelled. Herein, it is assumed that in a case where at least 30% of the manufacturing apparatuses 30 have started a process, then it is judged to cancel the transmission of the upgrade information.

As in the foregoing description, it is assumed that the state information is as shown in FIG. 13, and that transmission of upgrade information "upgrade_v021.exe" is started from the server apparatus 20 to the manufacturing apparatus 30 that is identified with apparatus identification information "D001" (step S601). Then, at the moment when a certain amount of data of the upgrade information has been transmitted, the state information is transmitted from the multiple manufacturing apparatuses 30, and received by the state information receiving portion 24 (steps S602 and S603), and the state information is updated by the state information updating portion 25 (step S604). In a case where it is detected by updating the state information that at least 30% of the manufacturing apparatuses 30 have started a process, then the transmission judging portion 26 judges to cancel the transmission of the upgrade information, and the transmission of the upgrade information performed by the transmitting portion 29 is cancelled (step S605).

In a case where it is judged to perform the transmission processing again (step S206), the transmission is performed again as long as conditions that enable the transmission are satisfied, as in Embodiment 1. When transmitting the upgrade information again, for example, it is possible to transmit all of the upgrade information, or it is also possible to transmit only untransmitted portions without transmitting portions that have been already transmitted.

As described above, with the group management system according to this embodiment, during transmission of the upgrade information, in a case where the manufacturing apparatus 30 as a transmission destination has started a process, or in a case at least a certain ratio of the manufacturing apparatuses 30 or at least a certain number of the manufacturing apparatuses 30 have started a process, then the transmission of the upgrade information is cancelled. Thus, processing relating to a process of the manufacturing apparatuses 30 can be performed in priority to transmission of the upgrade information. Accordingly, for example, a situation can be avoided in which the transmission of the upgrade information interrupts a process in the manufacturing apparatuses 30.

In the foregoing embodiments, a case was described in which when the upgrade information is transmitted from the server apparatus 20 to the manufacturing apparatuses 30, the transmission is performed to the manufacturing apparatuses 30 one by one, but there is no limitation to this. For example, the upgrade information may be transmitted all at once to multiple manufacturing apparatuses 30. For example, in a case where communication using IP (internet protocol) is performed in communication lines of the group management system, the upgrade information may be transmitted via broadcast communication or multicast communication.

Furthermore, in the foregoing embodiments, a case was described in which the transmission judging portion 26 judges whether or not to transmit the upgrade information, on each of the manufacturing apparatuses 30, but the transmission judging portion 26 may make the judgment all at once on multiple manufacturing apparatuses 30. For example, the transmission judging portion 26 may make the judgment all at once on multiple manufacturing apparatuses 30 having the same state indicated by the state information.

Furthermore, in the foregoing embodiments, each processing or each function may be implemented by integrated processing by a single apparatus or a single system, or alternatively, may be implemented by distributed processing by multiple apparatuses or multiple systems.

Furthermore, in the foregoing embodiments, each component may be constituted by dedicated hardware, or alternatively, components that can be implemented as software may be implemented by executing a program. For example, each component may be implemented by a program execution portion such as a CPU reading and executing a software program stored on a storage medium such as a hard disk or semiconductor memory. Herein, the software that implements the server apparatus in the foregoing embodiments may be a following program. Specifically, this program is a program for causing a computer to perform processing in a server apparatus included in a group management system that is provided with one or more manufacturing apparatuses for performing a predetermined semiconductor process on processing target substrates, and the server apparatus connected to the one or more manufacturing apparatuses, wherein the program causes the computer to execute an upgrade information receiving step of receiving upgrade information, which is information for upgrading an execution software program for controlling the manufacturing apparatus; a transmission judging step of judging not to transmit the upgrade information to the manufacturing apparatus if state information indicates that the manufacturing apparatus is performing a process, and of judging to transmit the upgrade information to the manufacturing apparatus if the state information indicates that the manufacturing apparatus is not performing a process, the state information being stored in a state information storage portion, being information relating to a state of the manufacturing apparatus, and being information that contains information relating to whether or not the manufacturing apparatus is performing a process; and a transmitting step of transmitting the upgrade information to the manufacturing apparatus to which it has been judged to transmit the upgrade information in the transmission judging step.

In the above-described program, in a transmitting step of transmitting information, a receiving step of receiving information, or the like, processing that can be performed only with hardware, such as processing that is performed with a modem, an interface card, or the like in the transmitting step, may also be included.

Furthermore, this program may be executed by downloading from a server or the like, or may be executed by reading a program stored on a predetermined storage medium (such as an optical disk such as a CD-ROM, a magnetic disk, or a semiconductor memory).

Furthermore, the computer that executes this program may be a single computer or multiple computers. More specifically, centralized processing or distributed processing may be performed.

The present invention is not limited to the embodiments set forth herein. Various modifications are possible within the scope of the present invention.

The disclosure of Japanese Patent Application No. 2006-298359 filed Nov. 2, 2006 including specification, drawings and claims is incorporated herein by reference in its entirety.

Although only some exemplary embodiments of this invention have been described in detail above, those skilled in the art will readily appreciate that many modifications are possible in the exemplary embodiments without materially departing from the novel teachings and advantages of this invention. Thus, all such modifications are intended to be included within the scope of this invention.

As described above, with the server apparatus and the like according to the present invention, the upgrade information can be transmitted as appropriate from the server apparatus to the one or more manufacturing apparatuses. Thus, the server apparatus and the like are useful in a group management system and the like at least having one or more manufacturing apparatuses for performing a predetermined semiconductor process on processing target substrates, and a server apparatus.

What is claimed is:

1. A server apparatus located in a first location, the server apparatus communicating, via a wired or wireless communication line including at least one of internet, intranet, and public telephone network, with a plurality of manufacturing apparatuses and with a client apparatus, each manufacturing apparatus being located remotely from the first location, the server apparatus comprising:

an upgrade information receiving portion that receives upgrade information, which relates to upgrading an execution software program configured to control the manufacturing apparatus;

a state information storage portion in which state information is stored, the state information relating to states of the manufacturing apparatuses, and whether or not each of the manufacturing apparatuses is performing a process;

a transmission judging portion that judges not to transmit the upgrade information via the wired or wireless communication line to one of the manufacturing apparatuses if the state information indicates that the one of the manufacturing apparatuses is performing a process, and that judges to transmit the upgrade information to the one of the manufacturing apparatuses if the state information indicates that the one of the manufacturing apparatuses is not performing a process; and a transmitting portion that transmits the upgrade information to the one of the manufacturing apparatuses to which the transmission judging portion has judged to transmit the upgrade information, wherein the client apparatus is configured to transmit the upgrade information to the server apparatus, and the server apparatus is configured to receive the upgrade information from the client apparatus and transmit the upgrade information to the one of the manufacturing apparatuses, wherein if the state information indicates that at least 30% of the number of manufacturing apparatuses to be upgraded are performing a process during transmission of the upgrade information to the one of the manufacturing apparatuses, then the transmission judging portion judges to cancel the transmission of the upgrade information, wherein the state information further contains information relating to whether or not each of the manufacturing apparatuses is communicable with the server apparatus, and the transmission judging portion judges not to transmit the upgrade information to each of the manufacturing apparatuses that is indicated by the state information to be incommunicable with the server apparatus, the upgrade information receiving portion is configured to receive apparatus identification information that identifies the manufacturing apparatus for which the execution software program is to be upgraded, and when it is judged not to transmit the upgrade information to the one of the manufacturing apparatuses in the transmission judging portion, the transmission judging portion judges to retry to transmit the upgrade information to the one of the manufacturing apparatuses by using the state information, wherein the manufacturing apparatuses are configured to perform a semiconductor process on at least one processing target substrate.

2. The server apparatus according to claim 1, wherein the execution software program is a system program of the manufacturing apparatuses.

3. The server apparatus according to claim 1, wherein the state information contains information relating to a version of a software program used in each of the manufacturing apparatuses, and the transmission judging portion judges not to transmit the upgrade information, to each of the manufacturing apparatuses that is indicated by the state information to be using a software program whose version is the same as or later than a version of a software program upgraded with the upgrade information that has been received by the upgrade information receiving portion.

4. The server apparatus according to claim 1, further comprising an instruction information storage portion in which instruction information, which is information indicating an instruction to create a predetermined folder, is stored, wherein the transmitting portion also transmits the instruction information.

5. The server apparatus according to claim 4, further comprising a folder judging portion that judges whether or not the predetermined folder is present in each of the manufacturing apparatuses to which the upgrade information is to be transmitted, wherein if the folder judging portion judges that the predetermined folder is not present in each of the manufacturing apparatuses, then the transmitting portion transmits the instruction information.

6. The server apparatus according to claim 1, further comprising:

a state information receiving portion that receives the state information of each of the manufacturing apparatuses; and a state information updating portion that updates the state information stored in the state information storage portion, according to the state information that has been received by the state information receiving portion.

7. The server apparatus according to claim 6, wherein when the transmitting portion is transmitting the upgrade information, if it is detected based on the state information that one of the manufacturing apparatuses as a transmission destination of the upgrade information has started a process, then the transmission judging portion judges to cancel the transmission of the upgrade information, and during transmission of the upgrade information, if the transmission judging portion judges to cancel the transmission of the upgrade information, then the transmitting portion cancels the transmission of the upgrade information.

8. The server apparatus according to claim 6, wherein when the transmitting portion is transmitting the upgrade information, if it is detected based on the state information that at least a certain ratio of the manufacturing apparatuses or at least a certain number of the manufacturing apparatuses have started a process, then the transmission judging portion judges to cancel the transmission of the upgrade information, and during transmission of the upgrade information, if the transmission judging portion judges to cancel the transmission of the upgrade information, then the transmitting portion cancels the transmission of the upgrade information.

9. A group management system, comprising a client apparatus, a server apparatus located at a first location, and a plurality of manufacturing apparatuses located remotely from the first location, the server apparatus communicating, via a wired or wireless communication line including at least one of internet, intranet, and public telephone network, with the plurality of manufacturing apparatuses and with the client apparatus, the server apparatus comprising:
- an upgrade information receiving portion that receives upgrade information, which relates to upgrading an execution software program configured to control the manufacturing apparatus;
- a state information storage portion in which state information is stored, the state information relating to states of the manufacturing apparatuses, and whether or not each of the manufacturing apparatuses is performing a process;
- a transmission judging portion that judges not to transmit the upgrade information via the wired or wireless communication line to one of the manufacturing apparatuses if the state information indicates that the one of the manufacturing apparatuses is performing a process, and that judges to transmit the upgrade information to the one of the manufacturing apparatuses if the state information indicates that the one of the manufacturing apparatuses is not performing a process; and
- a transmitting portion that transmits the upgrade information to the one of the manufacturing apparatuses to which the transmission judging portion has judged to transmit the upgrade information,
- wherein the client apparatus is configured to transmit the upgrade information to the server apparatus,
- the server apparatus is configured to receive the upgrade information from the client apparatus and transmit the upgrade information to the one of the manufacturing apparatuses, and
- each of the manufacturing apparatuses upgrades an execution software program configured to control each of the manufacturing apparatuses using the upgrade information,
- wherein if the state information indicates that at least 30% of number of the manufacturing apparatuses to be upgraded are performing a process during transmission of the upgrade information to the one of the manufacturing apparatuses, then the transmission judging portion judges to cancel the transmission of the upgrade information,
- wherein the state information further contains information relating to whether or not each of the manufacturing apparatuses is communicable with the server apparatus, and the transmission judging portion judges not to transmit the upgrade information to each of the manufacturing apparatuses that is indicated by the state information to be incommunicable with the server apparatus,
- the upgrade information receiving portion is configured to receive apparatus identification information that identifies the manufacturing apparatus for which the execution software program is to be upgraded, and
- when it is judged not to transmit the upgrade information to the one of the manufacturing apparatuses in the transmission judging portion, the transmission judging portion judges to retry to transmit the upgrade information to the one of the manufacturing apparatuses by using the state information,
- wherein the manufacturing apparatuses are configured to perform a semiconductor process on at least one processing target substrate.

10. The group management system according to claim 9, wherein the upgrade information receiving portion receives the upgrade information transmitted from the client apparatus.

11. A manufacturing apparatus that receives upgrade information transmitted from the server apparatus according to claim 1, and upgrades an execution software program configured to control each of the manufacturing apparatuses, using the upgrade information.

12. An information processing method used in a server apparatus included in a group management system that is provided with a plurality of manufacturing apparatuses being located remote from the server apparatus, the server apparatus communicating, via a wired or wireless communication line including at least one of internet, intranet, and public telephone network, with each of the manufacturing apparatuses and with a client apparatus, the information processing method comprising:
- an upgrade information receiving step of receiving upgrade information, which relates to upgrading an execution software program configured to control the manufacturing apparatus;
- a transmission judging step of judging not to transmit the upgrade information via the wired or wireless communication line to one of the manufacturing apparatuses if state information indicates that the one of the manufacturing apparatuses is performing a process, and of judging to transmit the upgrade information to the one of the manufacturing apparatuses if the state information indicates that the one of the manufacturing apparatuses is not performing a process, the state information being stored in a state information storage portion, being information relating to states of each of the manufacturing apparatuses, and being information that contains information relating to whether or not the one of the manufacturing apparatuses is performing a process; and
- a transmitting step of transmitting the upgrade information to the one of the manufacturing apparatuses to which it has been judged to transmit the upgrade information in the transmission judging step,
- wherein the client apparatus is configured to transmit the upgrade information to the server apparatus, and
- the server apparatus is configured to receive the upgrade information from the client apparatus and transmit the upgrade information to the one of the manufacturing apparatuses,
- wherein if the state information indicates that at least 30% of the number of manufacturing apparatuses to be upgraded are performing a process during transmission of the upgrade information to the one of the manufacturing apparatuses, then a transmission judging portion judges to cancel the transmission of the upgrade information,
- wherein the state information further contains information relating to whether or not each of the manufacturing apparatuses is communicable with the server apparatus, and the transmission judging portion judges not to transmit the upgrade information to each of the manufacturing apparatuses that is indicated by the state information to be incommunicable with the server apparatus,
- wherein an upgrade information receiving portion is configured to receive, during the upgrade information receiving step, apparatus identification information that identifies the manufacturing apparatus for which the execution software program is to be upgraded, and
- when it is judged not to transmit the upgrade information to the one of the manufacturing apparatuses in the transmission judging portion, the transmission judging portion judges to retry to transmit the upgrade information to the one of the manufacturing apparatuses by using the state information, wherein the manufacturing apparatuses are configured to perform a semiconductor process on at least one processing target substrate.

13. A computer-readable storage medium in which a program is stored, the program causing a computer to perform processing in a server apparatus included in a group management system that is provided with a plurality of manufacturing apparatuses, the server apparatus being located remote from each manufacturing apparatus and communicating, via a wired or wireless communication line including at least one of internet, intranet, and public telephone network, with each manufacturing apparatus and with a client apparatus, wherein the program causes the computer to execute:

an upgrade information receiving step of receiving upgrade information, which relates to upgrading an execution software program configured to control the manufacturing apparatus;

a transmission judging step of judging not to transmit the upgrade information via the wired or wireless communication line to one of the manufacturing apparatuses if state information indicates that the one of the manufacturing apparatuses is performing a process, and of judging to transmit the upgrade information to the one of the manufacturing apparatuses if the state information indicates that the one of the manufacturing apparatuses is not performing a process, the state information being stored in a state information storage portion, being information relating to states of each of the manufacturing apparatuses, and being information that contains information relating to whether or not the one of the manufacturing apparatuses is performing a process; and a transmitting step of transmitting the upgrade information to the one of the manufacturing apparatuses to which it has been judged to transmit the upgrade information in the transmission judging step, wherein the client apparatus is configured to transmit the upgrade information to the server apparatus, and the server apparatus is configured to receive the upgrade information from the client apparatus and transmit the upgrade information to the one of the manufacturing apparatuses, wherein if the state information indicates that at least 30% of the number of manufacturing apparatuses to be upgraded apparatuses are performing a process during transmission of the upgrade information to the one of the manufacturing apparatuses, then a transmission judging portion judges to cancel the transmission of the upgrade information, wherein the state information further contains information relating to whether or not each of the manufacturing apparatuses is communicable with the server apparatus, and the transmission judging portion judges not to transmit the upgrade information to each of the manufacturing apparatuses that is indicated by the state information to be incommunicable with the server apparatus, wherein an upgrade information receiving portion is configured to receive, during the upgrade information receiving step, apparatus identification information that identifies the manufacturing apparatus for which the execution software program is to be upgraded, and when it is judged not to transmit the upgrade information to the one of the manufacturing apparatuses in the transmission judging portion, the transmission judging portion judges to retry to transmit the upgrade information to the one of the manufacturing apparatuses by using the state information, wherein the manufacturing apparatuses are configured to perform a semiconductor process on at least one processing target substrate.

14. The server apparatus according to claim 1, wherein the state information includes measurement information including at least one of a temperature, a pressure and a gas flow rate of each of the manufacturing apparatuses, and the transmission judging portion determines, from the measurement information, whether the at least 30% of the number of manufacturing apparatuses to be upgraded are performing a process.

15. The group management system according to claim 9, wherein the state information includes measurement information including at least one of a temperature, a pressure and a gas flow rate of each of the manufacturing apparatuses, and the transmission judging portion determines, from the measurement information, whether the at least 30% of the number of manufacturing apparatuses to be upgraded are performing a process.

16. The information processing method according to claim 12, wherein the state information includes measurement information including at least one of a temperature, a pressure and a gas flow rate of each of the manufacturing apparatuses, and the transmission judging portion determines, from the measurement information, whether the at least 30% of the number of manufacturing apparatuses to be upgraded are performing a process.

17. The computer-readable storage medium according to claim 13, wherein the state information includes measurement information including at least one of a temperature, a pressure and a gas flow rate of each of the manufacturing apparatuses, and the transmission judging portion determines, from the measurement information, whether the at least 30% of the number of manufacturing apparatuses to be upgraded are performing a process.

* * * * *